United States Patent
Oppermann et al.

(10) Patent No.: US 6,334,157 B1
(45) Date of Patent: Dec. 25, 2001

(54) PROGRAMMATICALLY PROVIDING DIRECT ACCESS TO USER INTERFACE ELEMENTS OF AN APPLICATION PROGRAM

(75) Inventors: Charles Oppermann, Redmond; Nathaniel S. Brown, Seattle; Gregory C. Lowney, Redmond; Robert G. Atkinson, Woodinville; Laura J. Butler, Seattle; Peter Kam-Ho Wong, Mercer Island, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/815,100

(22) Filed: Mar. 11, 1997

(51) Int. Cl.[7] .................................................. G06F 9/00
(52) U.S. Cl. ................................ 709/310; 709/328
(58) Field of Search ................................ 709/300, 303, 709/310, 313, 328, 329; 395/326, 333; 345/338, 327, 158, 352

(56) References Cited

U.S. PATENT DOCUMENTS

| | | | |
|---|---|---|---|
| 5,363,121 | * 11/1994 | Freund | 709/101 |
| 5,394,521 | * 2/1995 | Henderson, Jr. et al. | 345/346 |
| 5,533,183 | * 7/1996 | Henderson, Jr. et al. | 395/158 |
| 5,717,877 | * 2/1998 | Orton et al. | 395/326 |
| 5,748,927 | * 5/1998 | Stein et al. | 395/333 |
| 5,754,176 | * 5/1998 | Crawford | 345/338 |
| 5,801,701 | * 9/1998 | Koppolu et al. | 345/352 |
| 5,901,313 | * 5/1999 | Wolf et al. | 709/302 |
| 6,057,831 | * 5/2000 | Harms et al. | 345/327 |

OTHER PUBLICATIONS

"Inside OLE", Second Edition, Microsoft Press (1995), pp. 1–143 and 635–730.

* cited by examiner

*Primary Examiner*—Zarni Maung
(74) *Attorney, Agent, or Firm*—Banner & Witcoff, Ltd.

(57) ABSTRACT

An architecture is provided that enables an accessibility aid to directly access and manipulate user interface elements of an application program programmatically. Moreover, such access and manipulation occurs in an application-independent manner, so that an accessibility aid utilizing the architecture can access any application program that conforms to the architecture, without the accessibility aid needing any prior knowledge of the application program or its user interface elements. User interface elements typically have both a visual representation displayed on the video display and an implementation, which is the code and data implementing the user interface element. The architecture provides an accessibility aid with direct access to the implementation of user interface elements, thus enabling the accessibility aid to both examine various characteristics of the user interface element and manipulate these characteristics, which may affect its visual representation.

28 Claims, 16 Drawing Sheets

| Events | Pointers to event handlers |
|---|---|
| Event_System_Sound | PTR1    PTR2    PTR3 |
| Event_System_Alert | PTR4 |
| Event_System_Foreground | PTR5 |ает
| ⋮ | ⋮ |

PROGRAMMATICALLY PROVIDING DIRECT ACCESS TO USER INTERFACE ELEMENTS OF AN APPLICATION PROGRAM

TECHNICAL FIELD

The present invention relates generally to data processing systems and, more particularly, to a method and system for programmatically providing direct access to user interface elements of an application program.

BACKGROUND OF THE INVENTION

People with disabilities have had difficulty being integrated into the workforce. Such integration into the workforce is hampered by difficulties in working with computers. Consequently, accessibility aids have been developed to facilitate computer operation by disabled users. For example, a "screen reader utility" is a type of accessibility aid that reads information displayed on a video display to a visually impaired user, which enables the user to utilize the computer. These screen reader utilities operate by intercepting and analyzing information sent to the video driver. That is, when an application program wants to display information on the video display, it sends the information to a video driver, which is responsible for displaying the information on the video display. For example, when an application program wants to display a character, such as an ASCII character, the program sends an ASCII character code to the video driver indicating which character of the ASCII character set to display on the video display. The screen reader intercepts this ASCII character code, determines the phonetic sounds associated with the ASCII character, and audibly outputs the phonetic sounds to the visually impaired user, so that the visually impaired user can perceive the character written to the video display.

Although these screen reader utilities work well with text, screen reader utilities do not work well with graphical elements, such as the well-known graphical elements depicted in FIGS. 1A–1D. For example, FIG. 1A depicts a window with a menu bar, a title bar, a tool bar, a combo box, a header control, a tree view, a status bar, a list view, a size grip, and a scroll bar. FIG. 1B depicts a window with a progress bar, a check box-style button and status text. FIG. 1C depicts a window with an edit box and a push button-style button, and FIG. 1D depicts a window with a tab control, a list box, and a radio button-style button.

When a program wants to display a graphical element, like a button, on the video display, it sends a bitmap to the video driver containing the representation of the button. The screen reader intercepts this bitmap, and the screen reader then attempts to interpret the bitmap. To facilitate this interpretation, the screen reader maintains a database containing both the bitmaps representing the graphical elements utilized by a particular application program and an indication of what each bitmap represents. The screen reader compares the intercepted bitmap with the bitmaps in the database to determine the graphical element represented by the intercepted bitmap, and then the screen reader audibly indicates to the user what the graphical element is. In this manner, the screen reader audibly indicates to the user what information is displayed on the video display, including both text and graphical elements.

This method for analyzing a graphical element has a drawback: the screen reader utility must know in advance the exact bitmaps of the graphical elements utilized by a particular application program. Even the slightest variation between the bitmap sent to the video driver and the corresponding bitmaps in the database will prevent a match from being made, and the screen reader will be unable to identify the graphical element. In this case, the user receives an incomplete understanding of the information on the video display, thus reducing his or her effective use of the computer system. Hence, conventional screen readers typically contain the bitmaps of the graphical elements utilized by a particular application program; conventional screen readers are thus application dependent. In other words, conventional screen readers cannot convey to a user information regarding graphical elements displayed by an application program without having a priori knowledge of the exact form of its graphical elements, and the screen reader will not work on another application program without having similar a priori knowledge. As a result of these limitations, screen readers, and accessibility aids as a whole, are unreliable and do not convey sufficient information to a disabled user so that the user can understand all elements that are displayed on the video display, including both text and graphical elements. It is thus desirable to improve the way in which accessibility aids identify the elements displayed by an application program to help integrate disabled users into the work force.

Because the detailed description assumes knowledge of various well-known object-oriented techniques, an overview of such techniques is provided below. In some cases, this overview is specific to the C++ programming language.

Two common characteristics of object-oriented programming languages are support for data encapsulation and data type inheritance. Data encapsulation refers to associating functions with data, and inheritance refers to declaring a data type in terms of other data types. Thus, inheritance provides for a hierarchy of data types, where the data types defined lower in the hierarchy share the structure or behavior of the data types defined higher in the hierarchy.

In the C++ programming language, data encapsulation and inheritance are supported through the use of classes. A class is a defined type, and a class declaration describes the data members and function members of the class. The data members and function members of a class are bound together such that the function members operate on a particular instance of the data members of the class. An instance of a class is also known as an object of the class. A class thus provides a definition for a group of objects with similar properties and common behavior.

To allocate storage for an object of a particular type (class), an object is instantiated. The term "instantiating" refers to allocating memory for data members and associating the data members with the function members. Once instantiated, the function members of the particular object can be invoked to access and manipulate the data members. In this manner, the function members implement the behavior of the object, and the object provides a structure for encapsulating data and behavior into a single entity.

To support the concept of inheritance, classes may be derived from (based upon the declaration of) other classes. A derived class is a class that inherits the characteristics—data members and function members—of its base classes. A class that inherits the characteristics of another class is a derived class, and conversely, a class that does not inherit the characteristics of another class is a primary (root) class. A class whose characteristics are inherited by another class is a base class. A derived class may inherit the characteristics of several classes and have several base classes, which is known as multiple inheritance.

A class may also specify whether its function members are virtual. Declaring that a function member is virtual allows the function to be overridden by a function of the same name and type in a derived class. If a virtual function is declared without providing an implementation, then it is referred to as a pure virtual function. A pure virtual function is a virtual function declared with the pure specifier ("=0"). If a class specifies a pure virtual function, then any derived class needs to specify an implementation for that function member before an object of that class can be instantiated. A class which contains at least one pure virtual function member is an abstract class.

FIG. 2 is a block diagram illustrating typical data structures used to represent an object. An object comprises instance data (data members) and function members, which implement the behavior of an object. The data structures used to represent an object comprise instance data structure 201, virtual function table 202, and the function members 203, 204, 205. The instance data structure 201 contains a pointer to the virtual function table 202 and contains data members. The virtual table 202 contains an entry for each virtual function member defined for the object. Each entry contains a reference to the code that implements the corresponding function member. In the following, an object will be described as an instance of a class as defined by the C++ programming language. One skilled in the art, however, will appreciate that other object models can be defined using other programming languages.

An advantage of using object-oriented techniques is, these techniques can be used to facilitate the sharing of objects. For example, a program implementing the function members of an instantiated object (a "server program") can share the object with another program (a "client program"). To allow an object of an arbitrary class to be shared with a client program, interfaces are defined through which an object can be accessed without the need for the client program to have access to the class implementation at compile time. An interface is a named set of logically related function members ("methods") and data members ("properties"). In C++, an interface is implemented as an abstract class with no data members and whose virtual functions are all pure. Thus, an interface provides a published protocol for two programs to communicate. Interfaces are typically used for derivation: a program defines (implements) classes that provide implementations for the interfaces the classes are derived from. Thereafter, objects are created as instances of these derived classes. Objects instantiated from a derived class implementing particular interfaces are said to "support" the interfaces. Typically, an object supports one or more interfaces depending upon the desired functionality.

The above-described object-oriented techniques have been successfully employed in Microsoft Corporation's Object Linking and Embedding (OLE) system. OLE is an object-based system in which each object conforms to the component object model by exposing a number of pre-defined interfaces. One of these interfaces is the IUnknown interface which contains the QueryInterface function member, and this function member provides access to all of the other interfaces supported by the object. Another interface supported by objects conforming to the component object model is the IDispatch interface, which allows the function members of an object to be invoked by a client without the client knowing at compile time the definition of the function member, which is known as dynamic binding. The IDispatch interface is described in greater detail in U.S. Pat. No. 5,515,536, entitled "Method and System for Invoking Methods of an Object Through a Dispatching Interface," issued May 7, 1996, which is hereby incorporated by reference. More generally, however, both OLE and the component object model are described in greater detail in Brockschmidt, Inside OLE, Second Edition, Microsoft Press (1995), at pages 1–143 and 635–730.

SUMMARY OF THE INVENTION

An architecture is provided that enables an accessibility aid to directly access and manipulate user interface elements of an application program programmatically. Moreover, such access and manipulation occurs in an application-independent manner, so that an accessibility aid utilizing the architecture can access any application program that conforms to the architecture, without the accessibility aid needing any prior knowledge of the application program or its user interface elements. A "user interface element" is information displayed on the video display that conveys meaning to a user, including both text and graphical elements like buttons, scroll bars, toolbars, edit boxes, and windows. User interface elements typically have both a visual representation displayed on the video display and an implementation, which is the code and data implementing the user interface element. The architecture provides an accessibility aid with direct access to the implementation of user interface elements, thus enabling the accessibility aid to both examine various characteristics of the user interface element and manipulate these characteristics, which may affect its visual representation.

By utilizing the architecture, accessibility aids can access and manipulate the user interface elements of any application program without the need to have a priori knowledge of the application program or its user interface. An accessibility aid communicates directly to the application program and to the implementation of its user interface elements via the architecture, and the accessibility aid can thus obtain a complete and rich description of the application program's user interface elements and can manipulate the user interface elements. Upon receiving the description of the user interface elements, the accessibility aid can convey this description to a disabled user via means which they can perceive, such as through audible output.

In accordance with a first aspect of the present invention, a method is practiced in a computer system for providing direct access to user interface elements of an application program programmatically. The application program exposes a programmatic access component for use by a client. The application program further receives a programmatic request identifying a user interface element to access via the programmatic access component and directly accesses the identified user interface element on behalf of the client responsive to the received programmatic request.

In accordance with a second aspect of the present invention, a method is practiced in a computer system for accessing user interface elements of an application program by a client. The client requests a reference to an interface supported by the application program, where the interface contains at least one function member that provides access to at least one of the user interface elements. Furthermore, the client receives the reference to the interface and invokes the function member to directly access and manipulate the user interface element in an application independent manner.

In accordance with a third aspect of the present invention, a method is practiced in a computer system for accessing a user interface element of a computer program. The user interface element has a class definition that is able to be instantiated into an object. The method starts the computer program, where the class definition is not instantiated, and the method receives a request to access the user interface element. In addition, the method instantiates the class definition such that an object is created that represents the user interface elements responsive to receiving the request.

In accordance with a fourth aspect of the present invention, a method is practiced in a computer system having an application program with a user interface having user interface elements and an operating system that manages the application program. The application program determines when a state of one of the user interface elements has changed, and the application program generates an event to notify listeners that the state of the user interface element has changed.

In accordance with a fifth aspect of the present invention, a method is practiced in a computer system for accessing user interface elements of an application program. The user interface elements are related to each other by a plurality of relations. The application program receives a programmatic request from a client indicating a user interface element and indicates one of the plurality of relations. Furthermore, the application program returns to the client a reference to a related user interface element that is related to the identified user interface element via the indicated relation.

DETAILED DESCRIPTION OF THE INVENTION

Figure 1A:
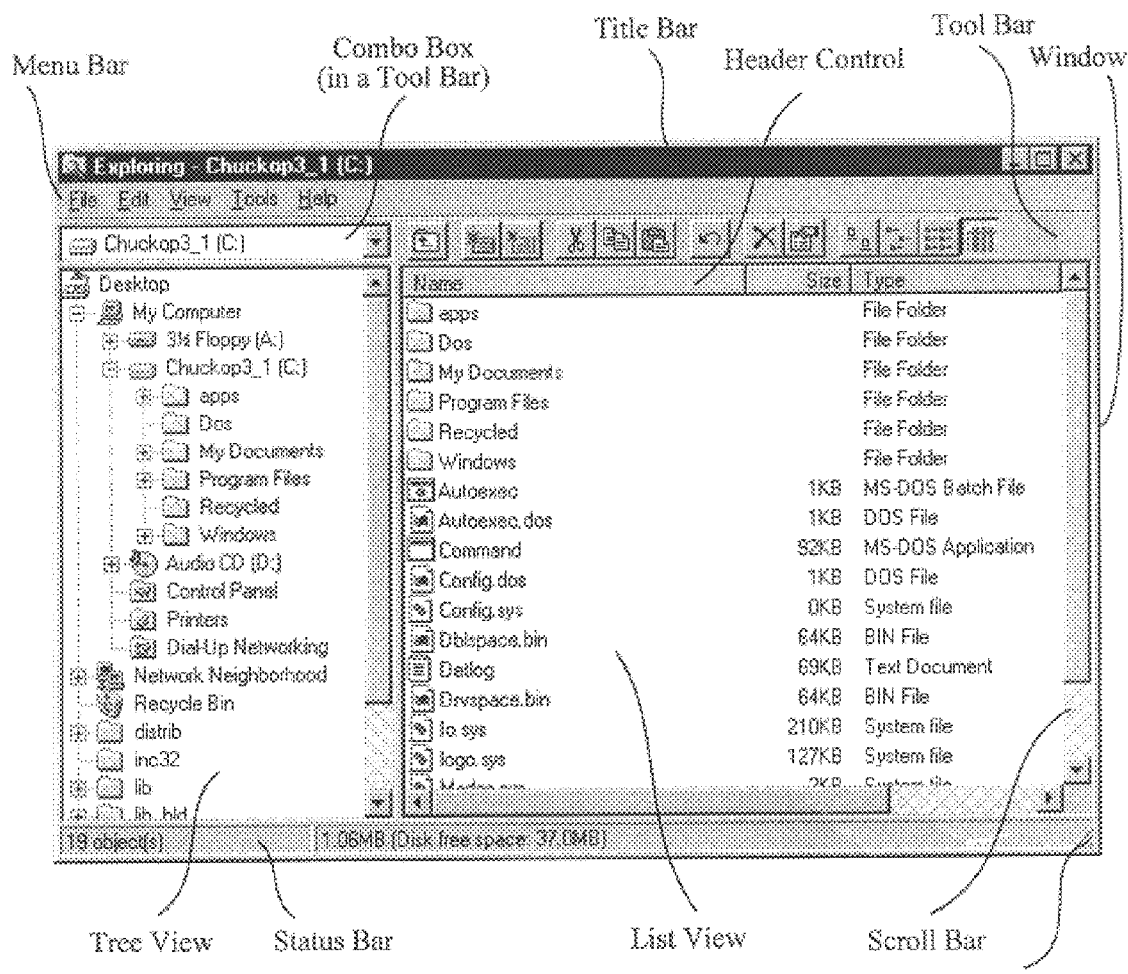
FIG. 1A–1D depict well-known graphical elements that are displayed as part of a user interface of a computer program.
Figure 1B:
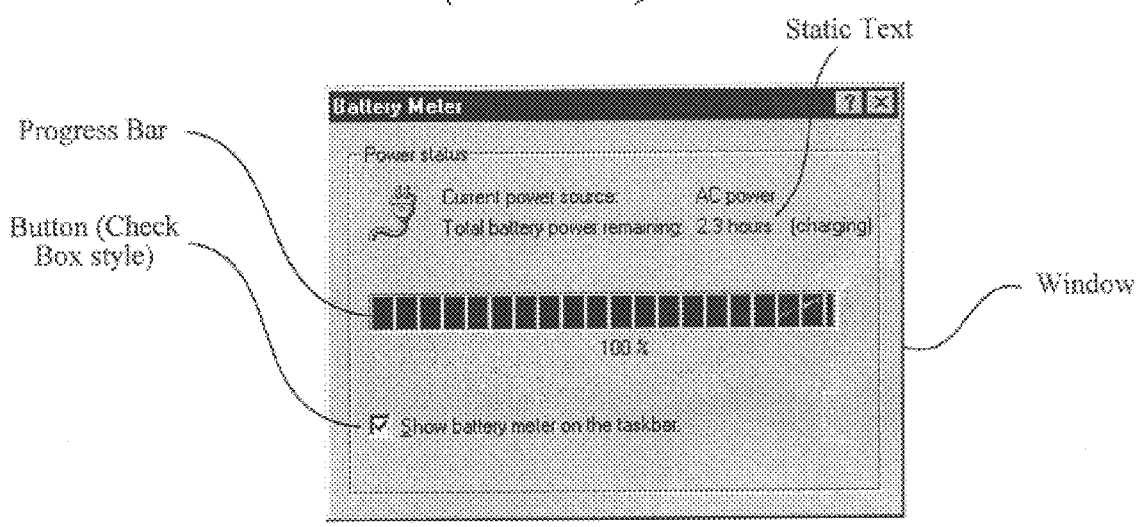
Figure 1C:
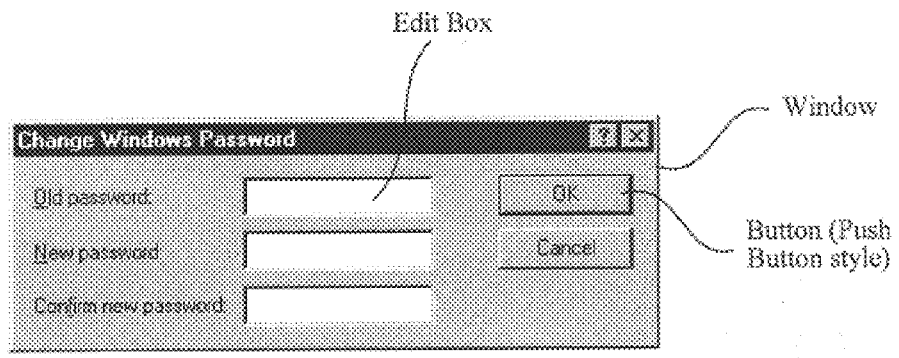
Figure 1D:
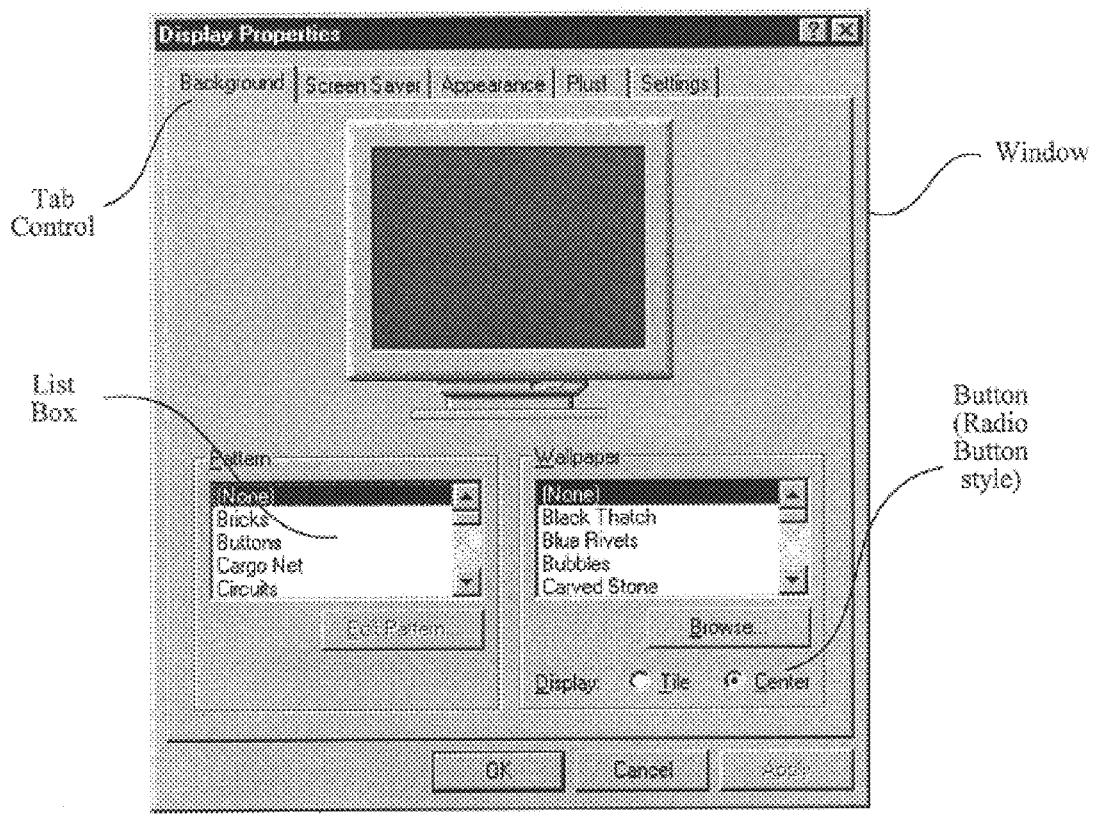
Figure 2:
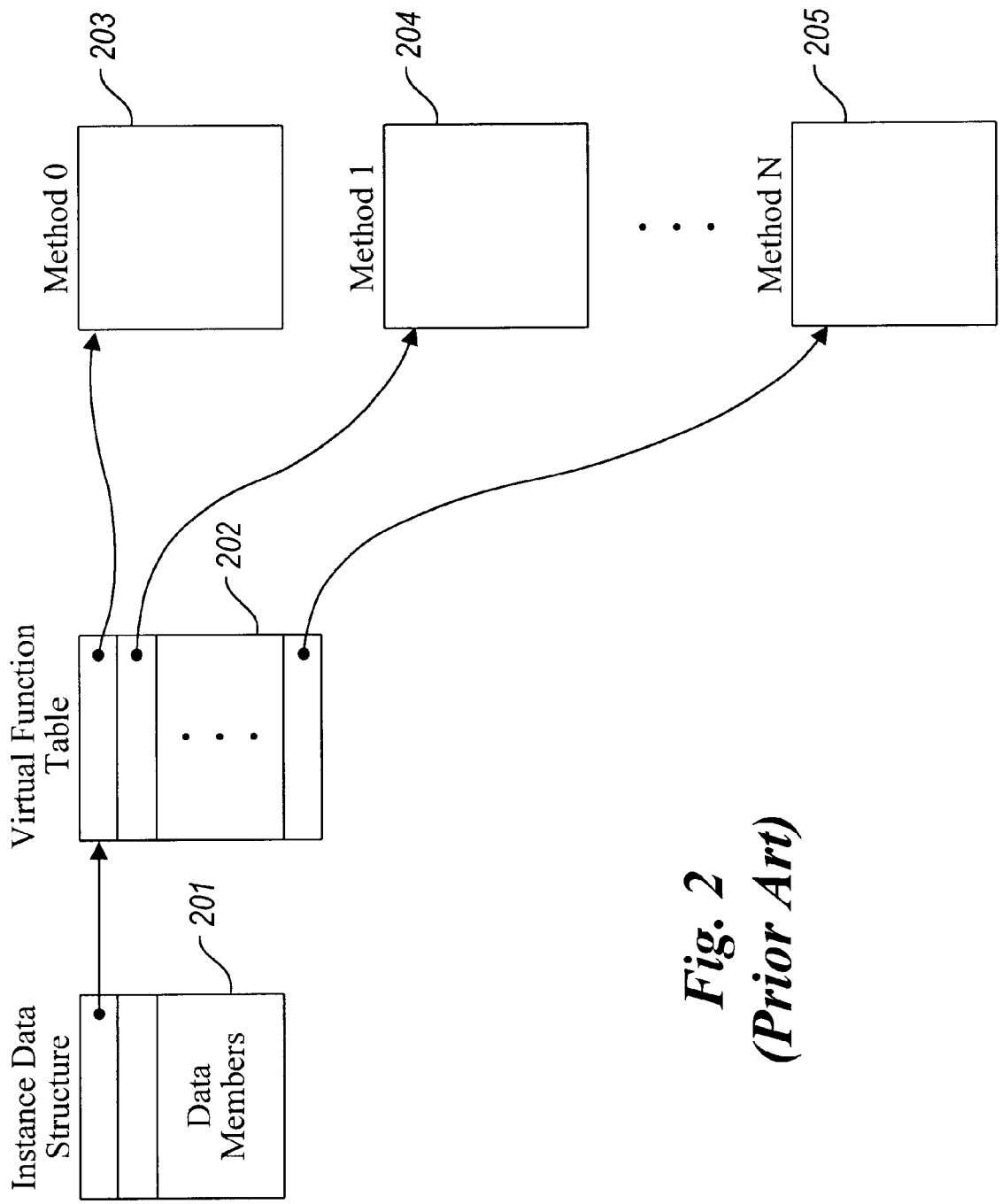
FIG. 2 is a block diagram illustrating conventional data structures used to represent an object.

A preferred embodiment of the present invention provides an architecture that enables an accessibility aid to directly access and manipulate user interface elements of an application program programmatically. Moreover, such access and manipulation occurs in an application-independent manner, so that an accessibility aid utilizing the preferred architecture can access any application program that conforms to the preferred architecture, without the accessibility aid needing any prior knowledge of the application program or its user interface elements. A "user interface element" is information displayed on the video display that conveys meaning to a user, including both text and graphical elements like buttons, scroll bars, toolbars, edit boxes, and windows. User interface elements typically have both a visual representation displayed on the video display and an implementation, which is the code and data implementing the user interface element. The preferred architecture provides an accessibility aid with direct access to the implementation of user interface elements, thus enabling the accessibility aid to both examine various characteristics of the user interface element and manipulate these characteristics, which may affect its visual representation.

By utilizing the preferred architecture, accessibility aids can access and manipulate the user interface elements of any application program without the need to have a priori knowledge of the application program or its user interface. An accessibility aid communicates directly to the application program and to the implementation of its user interface elements via the preferred architecture, and the accessibility aid can thus obtain a complete and rich description of the application program's user interface elements and can manipulate the user interface elements. Upon receiving the description of the user interface elements, the accessibility aid can convey this description to a disabled user via means which they can perceive, such as through audible output.

An example of an accessibility aid utilizing the preferred architecture is a screen reader utility. The screen reader utility receives audible commands from the user and invokes the commands on an application program utilizing the preferred architecture. These commands both access and manipulate the user interface elements of the application program.

The preferred architecture provides accessibility aids (or clients) with functionality that is unable to be performed by conventional systems. This functionality is useful in conveying a more rich, complete, and accurate description of the user interface elements of an application program. For example, clients can receive user interface element-based events that are generated by and originate from an application program, so that the clients are notified when a user interface element changes status. Such events include indications of when a button can no longer be activated or an indication in a spreadsheet program of which spreadsheet cell currently has focus. The term "focus" refers to an indication of a user interface element, such as a spreadsheet cell or window, to which all input from the keyboard is currently directed. In conventional systems, clients cannot receive such events originating from an application program, and the user is consequently unable to completely and accurately understand the user interface of the application program as it changes, which significantly reduces a user's ability to interact with the application program.

The preferred architecture also provides clients with the ability to navigate between user interface elements. User interface elements are typically displayed such that each user interface element has a relationship to the other user interface elements. Such relationships include each user interface element being part of a sequence. In some situations, the application program knows the sequence, and this sequence is not apparent to even sighted users until they manipulate the user interface. For example, a number of edit boxes may be related in a sequence such that when the user depresses the tab key, the cursor moves to the next edit box in the sequence. Such a relationship, however, has previously been imperceptible to a user who cannot view the visual representation of the user interface. Additionally, many user interface elements have a parent/child relationship. Two user interface elements have a parent/child relationship when the child is displayed within the borders of the parent. For example, a toolbar with buttons that perform particular actions has a parent relationship to the child buttons. Again, such a relationship has previously been imperceptible to a user who cannot view the visual representation of the user interface.

Through the use of the preferred architecture, clients can navigate between the user interface elements, determine their relationship, and convey this relationship to users who cannot visually perceive such relationships. The preferred architecture allows a client to navigate through a sequence of user interface elements to obtain the first, last, previous, or next user interface element in the sequence, and the preferred architecture allows a client to navigate through user interface elements in a parent/child relationship by identifying all children of a parent or identifying a parent of a child. Additionally, the preferred architecture enables a client to navigate through user interface elements using a direction relative to the video display, such as up, down, left or right. Such directional navigation allows a user to identify relationships among user interface elements, like text, on the video display. For example, a user can determine that data displayed on the computer display is displayed as a table with two columns, which conveys additional meaning to the user and which further enhances their effective use of both the computer and the application program.

Furthermore, using the preferred architecture, accessibility aids can query an application program for a textual description of a user interface element. For example, if the application program displays a scissor button that cuts selected text from a document, the textual description may be "this is a button that displays a pair of scissors." Using conventional systems, however, unless the accessibility aid has a priori knowledge, this information is unavailable to a user who cannot perceive the visual representation of the user interface, and this unavailability restricts the user's ability to interact with the computer system.

The preferred architecture also enables a user to determine what user interface element is located at a particular location on the video display. Typically, conventional accessibility aids, like screen readers, operate relative to a reference point, similar to a cursor, by reading the word under the reference point. However, if the reference point is located over a graphical element which the conventional screen reader cannot understand, no information is conveyed to the user, and the user has no way of knowing what is under the reference point, thus receiving an incomplete understanding of the user interface. Using the preferred architecture, the user can invoke a client to retrieve from the application program an indication of the user interface element at a particular location, which enables a user to move the reference point over the display and identify the user interface element at any given location to receive a complete description of the user interface.

Another advantage of the preferred architecture is that it allows a client to determine the menu structure of an application program without the application program having to display its user interface. Typically, in conventional systems, the only way that an application program's menu structure can be determined is through an accessibility aid "reading" the visual representation of the menu structure. Using the preferred architecture, however, an accessibility aid can query an application program to determine its menu structure, including all menus, submenus, and items on a submenu. In this manner, a user who is unable to view the visual representation of the menu structure can determine all of the commands supported by a particular application program, without the program having to display the menu structure, which saves processing time. In addition to the advantages described above, other benefits of using the preferred architecture will be apparent to those skilled in the art upon reading the following description.

OVERVIEW AND EXAMPLE

Figure 3:
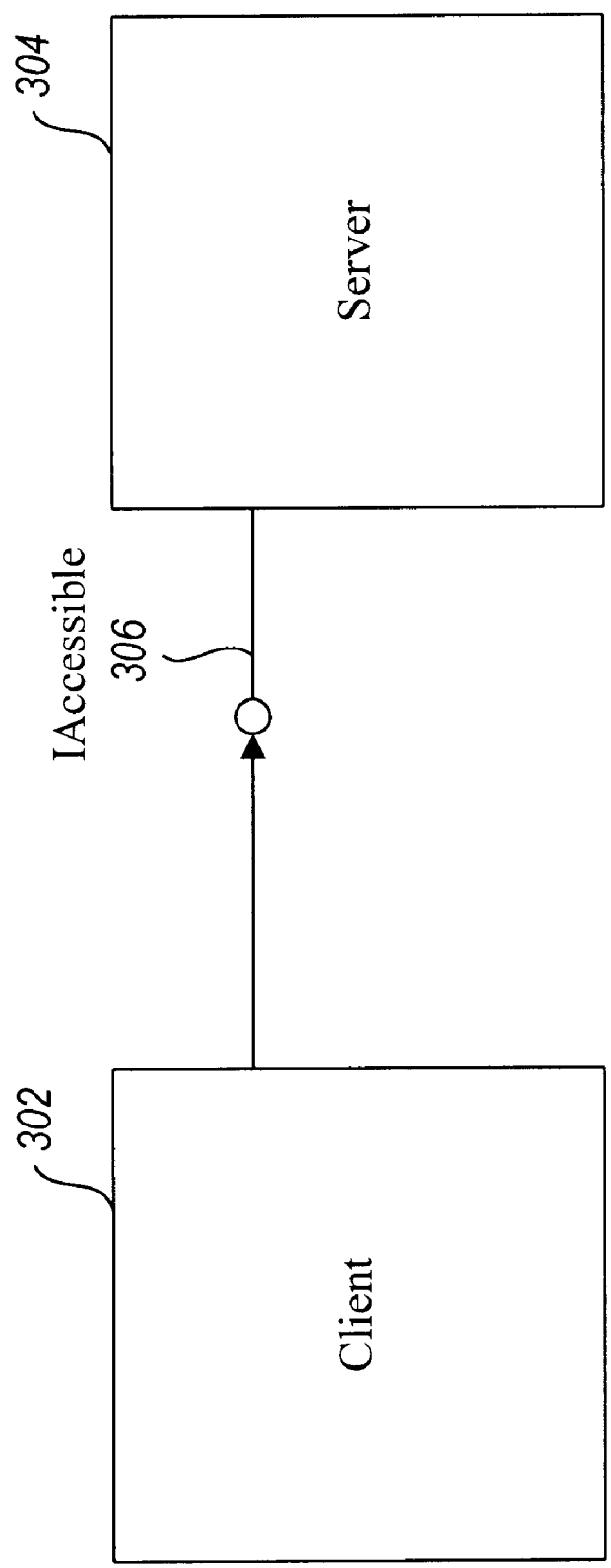
FIG. 3 depicts a client accessing an IAccessible interface of a server in accordance with a preferred embodiment of the present invention.

As part of the preferred architecture, an application program supports the IAccessible interface, which allows clients to reap the benefits of using the preferred architecture. As shown in FIG. 3, a client 302, such as an accessibility aid, accesses a server 304, such as an application program with user interface elements, via the IAccessible interface 306. The IAccessible interface 306 contains function members which allow the client 302 to directly access and manipulate the implementation of the user interface elements of the server 304. These function members allow the client 302 to access the user interface elements in the following ways: by navigating through the user interface elements, by retrieving the name for each user interface element, by determining whether each user interface element is visible or hidden, by retrieving the text description for each user interface element, by identifying the location of the user interface element, by determining the parent or child of a user interface element, and by determining the value of the user interface element. Some user interface elements have an associated value. For example, a clock user interface element has a value of the current time.

Additional function members on the IAccessible interface, instead of accessing the user interface element, enable the client to manipulate or modify characteristics of the user interface element. For example, these function members can perform the default action associated with the user interface element, select the user interface element, or set the value of the user interface element. Each user interface element capable of performing an action, such as a button, typically has an associated default action, like being pressed. One of the function members on the IAccessible interface allows a client to invoke the default action of a user interface element. Also, some user interface elements, such as text, are capable of being selected, which is typically indicated by highlighting the user interface element (e.g., the text) on the video display, and one of the function members on the IAccessible interface allows a client to select a user interface element. When a user interface element is selected, it can be manipulated in many well-known ways, like cutting, pasting, moving, or dragging and dropping. Although only a subset of the function members have been briefly described, each of the function members are described in greater detail below.

The server 304 typically supports the IAccessible interface 306 for each of its user interface elements. In some situations, however, the server 304 may only support the IAccessible interface 306 for a parent user interface element having a number of children. In this situation, the server 304 does not incur the overhead of creating an IAccessible interface for each of the children and thus saves a significant amount of memory.

The IAccessible interface can be accessed by the client in a number of ways. First, the client can invoke the QueryInterface function member on the IUnknown interface to obtain a reference to the IAccessible interface. The QueryInterface function member is supported by all interfaces of objects conforming to the component object model of OLE. Second, the client may invoke functions of the operating system to obtain a reference to an IAccessible interface for a user interface element. This second method of accessing the IAccessible interface is perhaps the most beneficial, because the client may not know exactly in which of the server's user interface elements it is interested, and these functions help determine which user interface element's IAccessible interface to obtain based on various characteristics of the user interface element. For example, the client may only have a location relative to the video display. In this situation, the client does not know which user interface element to query and therefore invokes a function of the operating system to obtain a reference to the IAccessible interface for that user interface element given its location. It is therefore advantageous to be able to query the operating system to retrieve a reference to the IAccessible interface for a user interface element.

Figure 4:
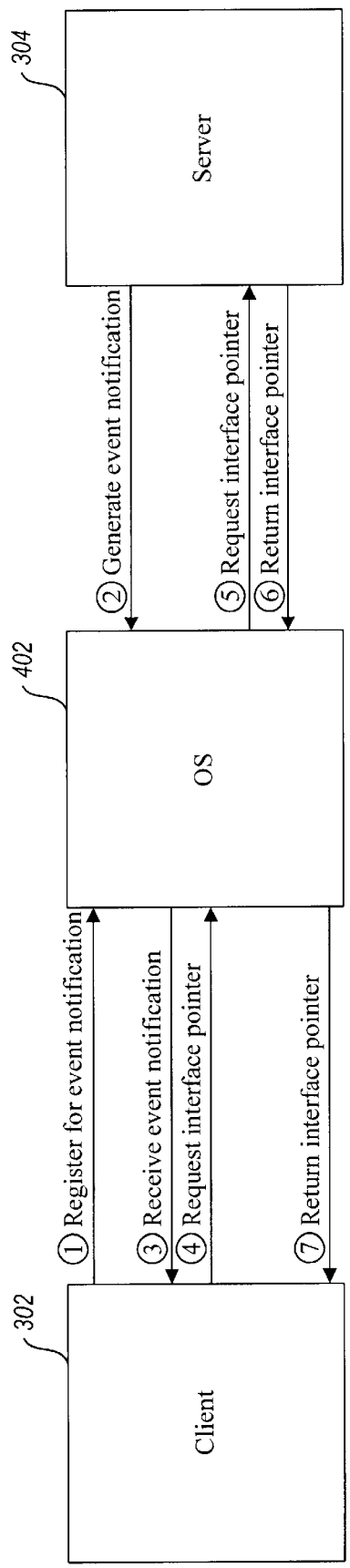
FIG. 4 depicts the interactions between a client, an operating system, and a server to obtain a pointer to the IAccessible interface of the server.

To provide the client with the benefits of using the preferred architecture, both the server and the operating system perform various functionality. To help describe this functionality, FIG. 4 depicts an example of the interactions between the client 302, the operating system 402, and the server 304. The client 302 is typically an accessibility aid, the server 304 is an application program with user interface elements, and the operating system 402 performs functionality that facilitates the interactions between the client and the server. As stated above, the client 302 can receive events from the server 304 and perform processing in response to these events. For example, the server 304 may display a "scissor button" that, upon depression, cuts selected text from a document. The scissor button, however, is only invokable when text is selected; when no text is selected, the button is inactive and takes on a gray appearance. The client 302 may want to be notified when the scissor button becomes activated, and after being notified, the client may then want to obtain the IAccessible interface for the scissor button, so that the client may activate the scissor button.

FIG. 4 depicts an overview of the interactions between the client 302, the server 304, and the operating system 402 to accomplish the functionality of the scissor button example. First, when the client 302 wants to be notified when the scissor button becomes activated, the client registers with the operating system 402. Second, sometime later, the server 304 generates an event notification indicating that the scissor button has become activated. Third, the operating system 402 receives the event notification and passes the event notification to the client 302. Fourth, upon receiving the event notification, the client 302 requests a reference to the IAccessible interface from the operating system 402 so that the client may activate the scissor button. Fifth, the operating system 402 passes this request to the server 304, and sixth, the server replies to the request with a reference to the IAccessible interface for the user interface element that generated the event. Seventh, the operating system 402 then returns the interface pointer to the client 302. Thereafter, the client 302 can activate the scissor button and, more generally, invoke the function members on the IAccessible interface to both access and manipulate the scissor button.

Implementation Details

Figure 5:
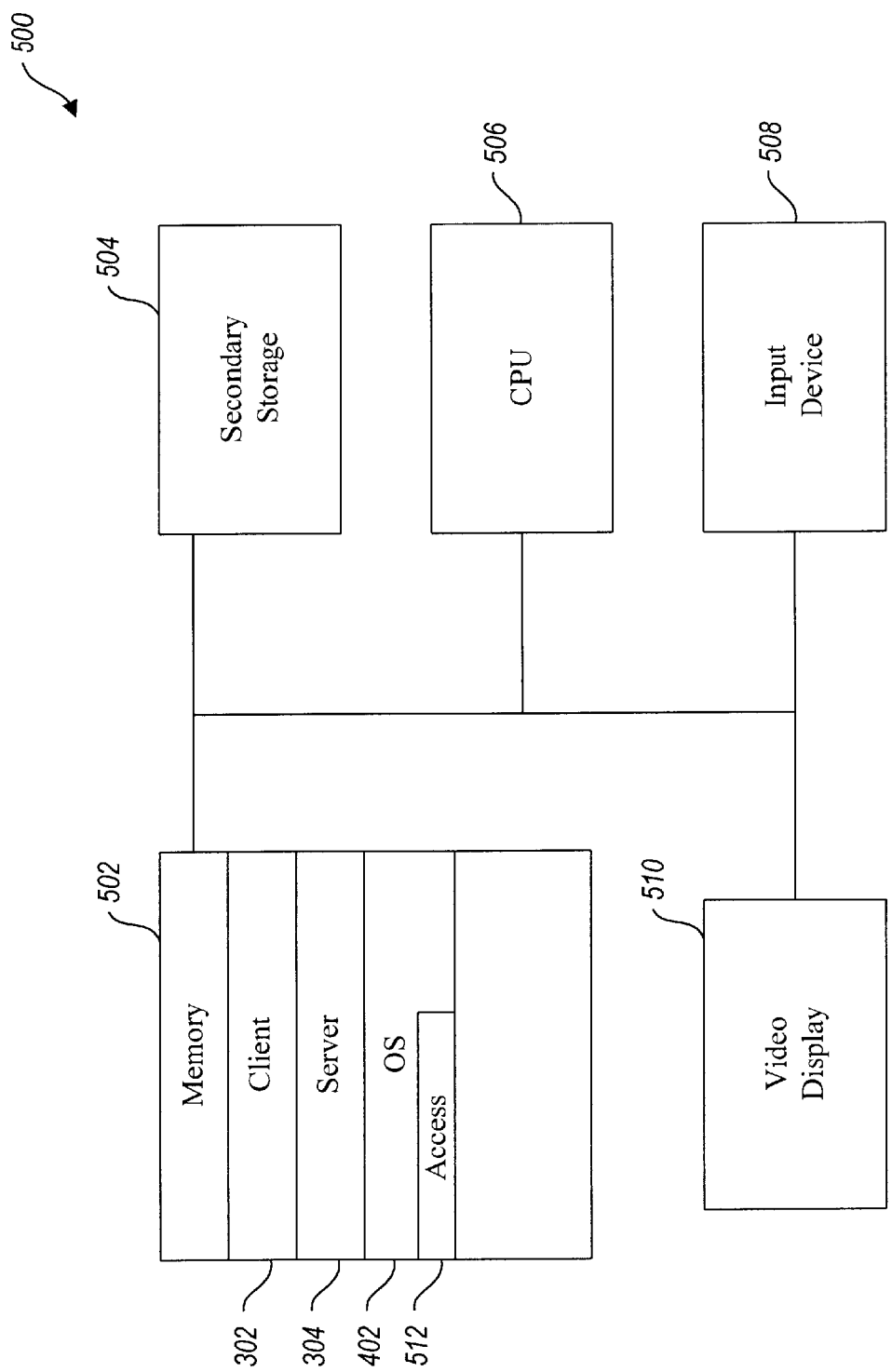
FIG. 5 depicts a computer system that is suitable for practicing a preferred embodiment of the present invention.

FIG. 5 depicts a computer system 500 that is suitable for practicing a preferred embodiment of the present invention. The computer system 500 contains a memory 502, a secondary storage device 504, a central processing unit (CPU) 506, an input device 508, and a video display 510. The memory 502 contains the client 302, the server 304, and the operating system 402. The operating system 402 contains an access component 512 that facilitates communication between the client 302 and the server 304 for accessibility-related processing. An example of an operating system 402 suitable for use in the computer system 500 is the Windows® 95 Operating System available from Microsoft Corporation of Redmond, Washington. The client 302 utilizes the function members on the IAccessible interface 306 exposed by the server 304. The server 304, as stated above, exposes the IAccessible interface 306 for a number of its user interface elements and also exposes an IUnknown interface, like all programs conforming to the OLE architecture. Although a preferred embodiment of the present invention is described below as conforming to the OLE architecture, one skilled in the art will appreciate that the present invention can work in other object-based systems or nonobject-based systems.

In order to conform to the preferred architecture, the server and the access component support various aspects of the architecture that are described below. In the following table, each component is indicated with the various aspects of the referred architecture that it supports.

| Component | Aspect of preferred architecture supported |
|---|---|
| Server | IAccessible Interface |
|  | Handling a WM_GetObject message |
| Access Component | LResultFromObject function |
|  | ObjectFromLResult function |
|  | SetWinEventHook function |
|  | NotifyWinEvent function |
|  | AccessibleObjectFromPoint function |
|  | AccessibleObjectFromEvent function |
|  | AccessibleObjectFromWindow function |

Below, each aspect of the preferred architecture supported by both the server and the access component is described in turn. It should be appreciated that when any application program supports the appropriate aspects of the architecture, a client may directly access that application program's user interface elements programmatically.

Aspects of the Preferred Architecture Supported by the Server

To support the preferred architecture, the server both exposes the IAccessible interface and handles a WM_GetObject message that is received from the access component and which requests a pointer to an IAccessible interface for a particular user interface element. Below, both the IAccessible interface and the functionality performed when handling a WM_GetObject message are described. Although the server is described as supporting the IAccessible interface, the access component can provide this functionality on behalf of the server as described in U.S. patent application Ser. No. 08/815,101, entitled "Providing Access to User Interface Elements of Legacy Application Programs," filed on even date herewith and issued as U.S. Pat. No. 6,144,377 on Nov. 7, 2000, which is hereby incorporated by reference. The application is assigned to a common assignee.

The IAccessible Interface

The IAccessible interface is described in two parts: first, the properties on the interface are described, and second, the function members on the interface are described.

IAccessible Properties

Below, each of the properties on the IAccessible interface is described. These properties include: (1) the Name property, (2) the Role property, (3) the State property, (4) the Value property, (5) the Description property, (6) the Focus property, (7) the Selection property, (8) the Default Action property, (9) the Location property, (10) the Help property, (11) the Help Topic property, and (12) the Keyboard Shortcut property.

3. State Property

The State property describes a user interface element's current status and an "alert level" (e.g., low, medium, or high) that indicates the importance of the status. A client can use these alert levels to gauge the information's urgency.

Some of the states of a user interface element supported by the preferred architecture follow:

| State | Meaning |
| --- | --- |
| STATE_SYSTEM_ALERT_HIGH | It is important that this information be conveyed to the user immediately. For example, a battery level indicator reaching a critical level conveys truly urgent information, so a screen reader utility should announce this information immediately. |
| STATE_SYSTEM_ALERT_LOW | This information is of low priority, so the user need not be immediately informed that it occurred. |
| STATE_SYSTEM_ALERT_MEDIUM | The user should be informed that this information is available, but the informational content need not be conveyed immediately. For example, when a battery level indicator reaches a low level, it should generate a medium-level alert. Screen reader utilities could then generate a sound to let the user know that important information is available, without actually interrupting the user's work. The user could then query the alert information at his or her leisure. |
| STATE_SYSTEM_ANIMATED | This status indicates that the user interface element's appearance is changing rapidly or constantly. |
| STATE_SYSTEM_BUSY | This status indicates that the user interface element cannot accept input at this time. |
| STATE_SYSTEM_CHECKED | This status indicates that the user interface element's check box is selected. |
| STATE_SYSTEM_FOCUSABLE | This status indicates that the user interface element can accept the keyboard input focus. |
| STATE_SYSTEM_FOCUSED | This status indicates that the user interface element has the keyboard input focus. |
| STATE_SYSTEM_INVISIBLE | This status indicates that the user interface element is hidden or invisible. |
| STATE_SYSTEM_MARQUEED | This status indicates that text is being scrolled or moved. |
| STATE_SYSTEM_MIXED | This status indicates a three-state check box or toolbar button. |
| STATE_SYSTEM_MULTISELECTABLE | This status indicates that the user interface element can select multiple items. |
| STATE_SYSTEM_OFFSCREEN | This status indicates that the user interface element is currently off the display and not visible. |
| STATE_SYSTEM_PRESSED | This status indicates that the user interface element is pressed. |
| STATE_SYSTEM_READONLY | This status indicates that the user interface element is read only. |
| STATE_SYSTEM_SELECTABLE | This status indicates that the user interface element can accept selection. |
| STATE_SYSTEM_SELECTED | This status indicates that the user interface element is currently selected. |

1. Name Property

The Name property is a string used by the server to identify a user interface element to a user. For example, the text on a button is its name, while the title of an edit box is its name.

2. Role Property

The Role property describes a user interface element's role or function. For example, a user interface element's role may be that of a scroll bar, a window, an edit box, etc. The Role property describes the user interface element's purpose in terms of its relationship with other user interface elements, like its siblings or children.

4. Value Property

The Value property represents visual information contained by the user interface element. For example, the value for an edit box is the text it contains, but a menu item has no value.

5. Description Property

A user interface element's Description property provides a textual description for a user interface element's visual appearance. For example, if the user interface element is a scissor button, the description may be a "button displaying a pair of scissors."

6. Focus Property

A user interface element's focus property indicates which of its children has the keyboard focus. It should be noted that user interface element selection and user interface element focus are two entirely different ideas. The "focused" user interface element is the one user interface element in the entire system that receives keyboard input, while the "selected" user interface element is marked to participate in some type of group operation. Additionally, focused items can be in or out of a selection of items. For example, you can select several items in preparation for moving or deleting them all. However, the focus is given only to one user interface element in the system at a time.

7. Selection Property

A user interface element's Selection property indicates which of its children are selected.

8. DefaultAction Property

A user interface element's DefaultAction property describes its primary method of manipulation from the user's viewpoint. The DefaultAction property is different than the user interface element's Value property. Some user interface elements, such as an edit box, may have a value but not a default action. Consider the following examples:

1) A selected check box has a default action of "Uncheck" and a value of "Checked."

2) A cleared check box has a default action of "Check" and a value of "Unchecked."

3) A button labeled "Print" has a default action of "Press," with no value.

4) An edit box that shows "Printer" has no default action, but would have a value of "Printer."

9. Location Property

The Location property contains the coordinates of the "bounding rectangle" of the user interface element on the video display. That is, the perimeter of a user interface element forms a rectangle, and the location property specifies the Cartesian coordinates for the upper left corner and the lower right corner of the rectangle relative to the video display.

10. Help Property

The Help property contains help text that is associated with a user interface element. For example, the Help property for a toolbar button that shows a printer may be "Prints the current document." This text is not always unique within the user interface; it acts purely to elaborate on the user interface element's purpose and what actions it might perform.

11. HelpTopic Property

The HelpTopic property contains details about a Help file that provides information about a user interface element. The details are provided in the form of a string that represents the path to the Help file and a value identifying the topic of interest. The path name retrieved may be a network path (e.g., "\\network\share\directory\filename.ext") or a Uniform Resource Locator (URL) to an Internet resource (e.g., "http://www.microsoft.com/windows/enable/helpfile.htm").

12. KeyboardShortcut Property

The KeyboardShortcut property is a string describing a key or key combination that will activate the user interface element. This shortcut key string can be used to describe "shortcut keys" or "access keys." Each is described in the following table:

| Term | Description |
| --- | --- |
| Shortcut keys | Key combinations that invoke an action. For example, CTRL +0 is often used to invoke the Open file common dialog box. |
| Access keys | Single keys, usually shown underlined in a drop-down menu or dialog box, that invoke an action when pressed. For example, if a user activates an application's File menu, the "o" key often invokes the Open file common dialog box. Access keys are usually only available when the user interface element, like a menu, has keyboard focus. For example, access keys are available for items on a menu when any part of that menu has focus. |

The KeyboardShortcut property reflects shortcuts as the key or keys the user must press when the user interface element has keyboard focus. For example, the Print menu command might have both a shortcut key (CTRL+P) and an access key (P). If the user presses "CTRL+P" while the menu is active, nothing happens, but pressing "P" invokes the application's Print dialog box. In this case, the KeyboardShortcut property is "P," to reflect what the user must press when the menu is active and has keyboard focus.

IAccessible Function Members

As stated above, the server exposes the IAccessible interface so that the client can directly access and manipulate all of the user interface elements of the server. Below, each of the function members of the IAccessible interface are described. These function members include: (1) accDoDefaultAction, (2) accHitTest, (3) accLocation, (4) accNavigate, (5) accSelect, (6) get_accChild, (7) get_accChildCount, (8) get_accDefaultAction, (9) get_accDescription, (10) get_accFocus, (11) get_accHelp, (12) get_accHelpTopic, (13) get_accKeyboardShortcut, (14) get_accName, (15) get_accParent, (16) get_accRole, (17) get_accSelection, (18) get_accState, (19) get_accValue, (20) put_accName, and (21) put_accValue.

1. IAccessible::accDoDefaultAction

HRESULT accDoDefaultAction(VARIANT varChild);

This function member performs the user interface element's default action and returns S_OK if successful or an error code otherwise.

varChild—[in] This parameter is a variant structure identifying the user interface element whose default action will be invoked. This parameter may indicate that the default action of a child of the identified user interface element should be invoked. The variant structure is a union that can contain many types of data. The first element of the variant structure is the vt element, which describes the type of data contained in at least one of the remaining elements. The variant structure is described in greater detail in Brockschmidt, *Inside OLE*, at pages 647–653. The notation "[in]" indicates that the varChild parameter is an input parameter only; it is not used to output a value.

2. IAccessible::accHitTest

HRESULT accHitTest(long xLeft, long yTop, VARIANT*pvarChild);

This function member retrieves a reference to the IDispatch interface of a user interface element at a given point on the screen and returns S_OK if successful or an error code otherwise.

xLeft and yTop—[in] These parameters contain screen coordinates of a point on the video display.

pvarChild—[out, retval] This parameter is the address of a VARIANT structure that will contain information describing the user interface element at the point specified by the xLeft and yTop parameters, if any. If the specified point exists outside the current user interface element's boundaries, the vt element indicates that there is no data in the structure. Otherwise, the vt member indicates that a user interface element's IDispatch interface pointer is contained in the structure.

3. IAccessible::accLocation

HRESULT accLocation(long*pxLeft, long*pyTop, long*pcxWidth, long*pcyHeight, VARIANT varChild);

This function member retrieves the user interface element's current display location (if the user interface element is visible on the screen) and, optionally, the child user interface element. This function member returns S_OK if successful or an error code otherwise.

pxLeft and pyTop—[out] These parameters specify the x and y coordinates of the upper left boundary of the user interface element's location.

pcxWidth and pcyHeight—[out] These parameters contain a value specifying the user interface element's width and height, in pixels.

varChild—[in] This parameter contains a value identifying the user interface element whose location will be retrieved. This parameter may identify a child of the user interface element, if the child supports the IAccessible interface.

4. IAccessible::accNavigate

HRESULT accNavigate(long navDir, VARIANT varStartFromChildOrSelf, VARIANT*pvarEndUpAt);

This function member retrieves the next or previous sibling user interface element or child user interface element in a specified direction. This function member returns S_OK if successful or an error code otherwise.

NavDir—[in] This parameter is a value specifying the direction in which to move from the indicated user interface element, which is either the current user interface element or one of its children. This direction can be in spatial order where the direction is specified relative to the video display (e.g., up, down, left, or right), or navigational order where the direction is specified in relation to other user interface elements in a sequence (e.g., next, previous, first, or last).

The navDir parameter may take any one of the following values:

| | |
|---|---|
| NAVDIR_UP | Requesting user interface elements physically above the current one relative to the video display. |
| NAVDIR_DOWN | Requesting user interface elements physically below the current one. |
| NAVDIR_LASTCHILD | Go to the last child of this user interface element. |
| NAVDIR_FIRSTCHILD | Go to the first child of this user interface element. |
| NAVDIR_LEFT | Requesting user interface elements physically to the left of the current one. |
| NAVDIR_RIGHT | Requesting user interface elements physically to the right of the current one relative to the video display. |
| NAVDIR_NEXT | The next logical location or user interface element, generally a "sibling" to the current user interface element. For example, in a dialog box, the TAB key moves to the next logical location, although this can be represented in any number of different physical directions. |
| NAVDIR_PREVIOUS | The previous logical location or user interface element. In a dialog box, the SHIFT+TAB key combination moves to the previous logical control, although this may be in any number of physical directions visually on the screen. For example, in vertical toolbars, logically the previous button is often the button physically above (NAVDIR_UP) the current one, whereas in horizontal toolbars, logically the previous button is generally the button physically to the left (NAVDIR_LEFT) of the current one. | varStartFromChildOrSelf—[in] This parameter is a VARIANT structure that specifies whether the navigation starts from the current user interface element or one of its children. The function member may retrieve a sibling user interface element or a child user interface element.

pvarEndUpAt—[out, retval] This parameter is an address of a VARIANT structure that will contain information about the destination user interface element. This information may include the address of the destination user interface element's IDispatch interface or an identifier of the user interface object if it does not support the IDispatch interface.

Figure 6A:
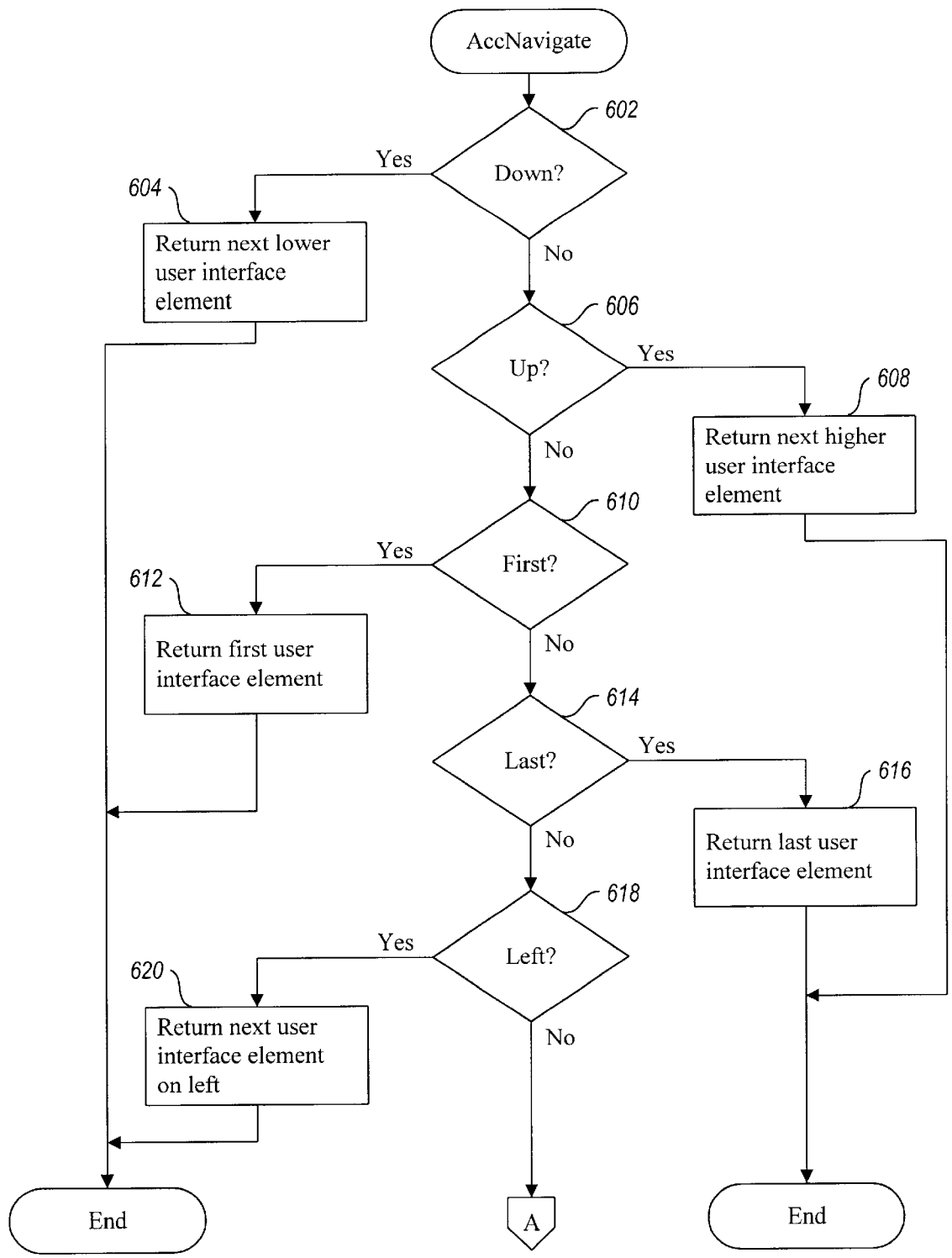
FIGS. 6A and 6B depict a flowchart of the steps performed by the accNavigate function member on the IAccessible interface.
Figure 6B:
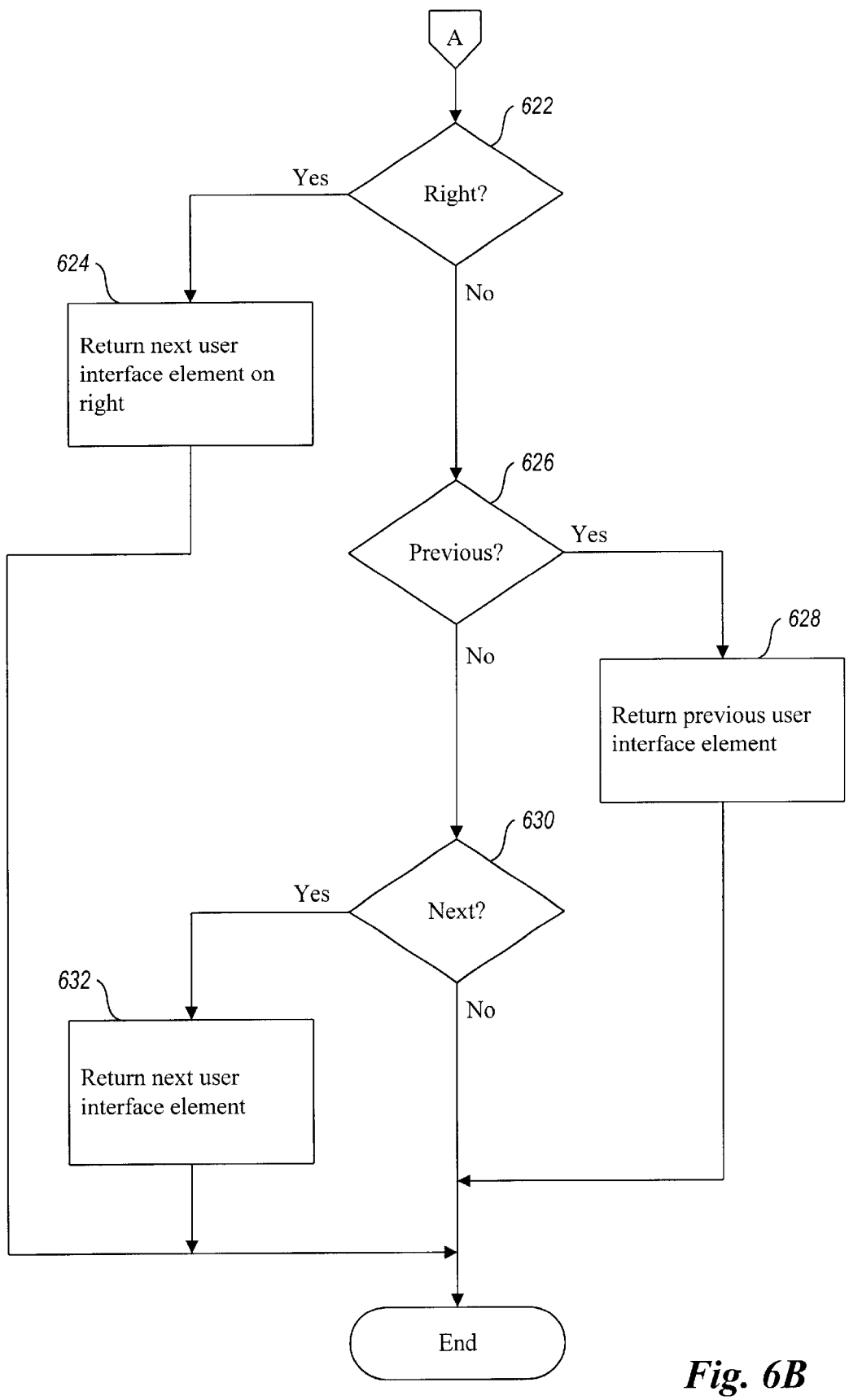

FIGS. 6A and 6B depict a flowchart of the steps performed by the accNavigate function member. When invoked, the accNavigate function member determines whether the direction of navigation is down (step 602). This determination is made by examining the NavDir parameter. If the navigational direction is down, the accNavigate function returns a pointer to the IDispatch interface of the next lower user interface element as it appears on the video display (step 604). If the navigational direction is not down, the accNavigate function member determines if the navigational direction is up (step 606). If the navigational direction is up, the accNavigate function member returns a pointer to the IDispatch interface of the next higher user interface element as it appears on the video display (step 608). If the navigational direction is not up, the accNavigate function member determines if the first user interface element in a sequence is requested (step 610). If the first user interface element is requested, the accNavigate function member returns a pointer to the IDispatch function member of the first user interface element (step 612). If the first user interface element is not requested, the accNavigate function member determines if the last user interface element is requested (step 614). In this case, the accNavigate function member returns a pointer to the IDispatch interface of the last user interface element in the sequence (step 616).

If the last user interface element has not been requested, the accNavigate function member determines if a user interface element on the left is requested (step 618). If the user interface element on the left is requested, the accNavigate function member returns a pointer to the IDispatch interface of the next user interface element on the left relative to the location of the current user interface element on the video display (step 620). If the user interface element on the left has not been requested, the accNavigate function member determines if the user interface element on the right has been requested (step 622 in FIG. 6B). If the user interface element on the right has been requested, the accNavigate function member returns a pointer to the IDispatch interface of a user interface element on the right relative to the location of the current user interface element on the video display (step 624). Next, the accNavigate function member determines if the previous user interface element has been requested in a sequence of user interface elements (step 626). If the previous user interface element has been requested, the accNavigate function member returns a pointer to the IDispatch interface of the previous user interface element (step 628). If the previous user interface element has not been requested, the accNavigate function member determines if the next user interface element has been requested (step 630). If the next user interface element has been requested, the accNavigate function member returns a pointer to the IDispatch interface of the next user interface element (step 632).

5. IAccessible::accSelect

HRESULT accSelect(long flagsSelect, VARIANT varchild);

This function member modifies the selection or moves the keyboard focus according to the specified flags. This function member returns S_OK if successful or an error code otherwise.

flagsSelect—[in] This parameter is a value specifying how to change the current selection. For example, this value specifies whether to add only the indicated user interface element to the selection, whether the selection should be extended to include the indicated user interface element and all unselected user interface elements in between, whether the indicated user interface element should be removed from the selection, or whether the indicated user interface element should be the only user interface element selected. Additionally, these flags indicate whether the indicated user interface element should be given focus.

varChild—[in] This parameter is a value identifying the user interface element that will be selected or a child of the user interface element.

6. IAccessible::get_accChild

HRESULT get_accChild(VARIANT varChild, IDispatch** ppdispChild);

This function member retrieves an IDispatch interface of the specified user interface element or its child and returns S_OK if successful or an error code otherwise.

varChild—[in] This parameter is a VARIANT structure that identifies the user interface element to be retrieved or a child of the user interface element.

PpdispChild—This parameter is a reference to the IDispatch interface for the specified user interface element.

7. IAccessible::get_accChildCount

HRESULT get_accChildCount(long* pcountChildren);

This function member retrieves the number of children belonging to the specified user interface element and returns S_OK if successful or an error code otherwise.

pcountChildren—[out, retval] This parameter is an address of a variable that will contain the number of child user interface elements belonging to the specified user interface element.

8. IAccessible::get_accDefaultAction

HRESULT get_accDefaultAction(VARIANT varChild, BSTR* pszDefaultAction);

This function member retrieves a string containing a sentence that describes the user interface element's default action. This function member returns S_OK if successful or an error code otherwise.

varChild—[in] This parameter is a VARIANT structure that identifies the user interface element whose default action will be retrieved.

pszDefaultAction—[out, retval] This parameter is an address of a string describing the default action for this user interface element, or NULL if this user interface element has no default action. The retrieved string describes the action that is performed on a user interface element, not what the user interface element does as a result. That is, a toolbar button that prints a document would have a default action of "Press" rather than "Prints the current document."

9. IAccessible::get_accDescription

HRESULT get_accDescription(VARIANT varChild, BSTR* pszDescription);

This function member retrieves a string in the Description Property containing a sentence that describes the specified user interface element. This function member returns S_OK if successful or an error code otherwise.

varChild—[in] This parameter is a value identifying the user interface element whose description will be retrieved.

pszDescription—[out, retval] This parameter is an address of a string describing the specified user interface element. The user interface element description conveys the user interface element's visual appearance to the user.

10. IAccessible::get_accFocus

HRESULT get_accFocus(VARIANT*pvarChild);

This function member retrieves the user interface element that currently has the keyboard focus. This function member returns S_OK if successful or an error code otherwise.

pvarChild—[out, retval] This function member is an address of a VARIANT structure that will contain information about the retrieved user interface element. If the specified user interface element does not contain a user interface element that has keyboard focus, then the vt member is VT_EMPTY. If vt is VT_DISPATCH, then the structure contains the address of the child user interface element's IDispatch interface.

11. IAccessible::get_accHelp

HRESULT get_accHelp(VARIANT varChild, BSTR*pszhelp);

This function member retrieves a user interface element's Help property string and returns S_OK if successful or an error code otherwise.

varChild—[in] This parameter contains a VARIANT structure that identifies the user interface element whose default action will be retrieved.

pszHelp—[out, retval] This parameter is an address of the Help property string for the specified user interface elements, or NULL if no Help string is available. A user interface element's Help property is represented in the form of a string that provides some helpful text to associate with the specified user interface element.

12. IAccessible::get_accHelpTopic

HRESULT get_accHelpTopic(BSTR*pszHelpFile, VARIANT varChild, long*pidTopic);

This function member retrieves the full path of the Help file associated with the specified user interface element, as well as the address of the appropriate topic within that file. The system maintains a Help file with many topics and each topic has an associated string that provides useful information to the user. This function member returns S_OK if successful or an error code otherwise.

pszHelpFile—[out] This parameter is an address of a string describing the path of the Help file associated with the specified user interface elements, if any.

varChild—[in] This parameter is a VARIANT structure identifying the user interface element whose Help information will be retrieved.

pidTopic—[out, retval] This parameter is an address of a value identifying the Help file topic associated with the object.

13. IAccessible::get_accKeyboardShortcut

HRESULT get_accKeyboardShortcut(VARIANT varChild, BSTR * pszKeyboardShortcut);

This function member retrieves a user interface element's KeyboardShortcut property, and this function member returns S_OK if successful or an error code otherwise.

varChild—[in] This parameter is a VARIANT structure identifying the user interface element whose keyboard shortcut will be retrieved.

pszKeyboardShortcut—[out, retval] This parameter is an address of a string containing the keyboard shortcut string, or NULL if no keyboard shortcut is associated with this user interface element.

14. IAccessible::get_accName

HRESULT get_accName(VARIANT varChild, BSTR* pszName);

This function member retrieves the Name property for this user interface element and returns S_OK if successful or an error code otherwise.

varChild—[in] This parameter is a VARIANT structure identifying the user interface element whose name will be retrieved or a child of the user interface element.

pszName—[out, retval] This parameter is an address of a string containing this user interface element's name.

15. IAccessible::get_accParent

HRESULT get_accParent(IDispatch**ppdispParent);

This function member retrieves the IDispatch interface of the indicated user interface element's parent. This function member returns S_OK if successful or an error code otherwise.

ppdispParent—[out, retval] This parameter is an address of a variable that will contain the parent's IDispatch interface. The variable will be set to NULL if no parent exists or the user interface element cannot access its parent.

16. IAccessible::get_accRole

HRESULT get_accRole(VARIANT varChild, VARIANT*pvarRole);

This function member retrieves the object's Role property and returns S_OK if successful or an error code otherwise.

varChild—[in] This parameter is a VARIANT structure that identifies the user interface element whose role will be retrieved.

pvarRole—[out, retval] This parameter is an address of a VARIANT structure that will contain an identifier or a string describing the user interface element's role.

17. IAccessible::get_accSelection

HRESULT get_accSelection(VARIANT*pvarChildren);

This function member retrieves the selected children of the specified user interface element and returns S_OK if successful or an error code otherwise.

pvarChildren—[out, retval] This parameter is an address of a VARIANT structure that will contain information about the child object or objects. The vt member will be set to one of the following values, indicating the result.

| | |
|---|---|
| VT_DISPATCH | One child was selected and the address of its IDispatch interface is contained in the data. |
| VT_EMPTY | No children were selected. |
| VT_I4 | One child was selected. |
| VT_UNKNOWN | Multiple children were selected. |

18. IAccessible::get_accState

HRESULT get_accState(VARIANT varChild, VARIANT*pvarState);

This function member retrieves the state property of the user interface element or its child. This function member returns S_OK if successful or an error code otherwise.

varChild—[in] This parameter is a VARIANT structure identifying the user interface element whose state will be retrieved.

pvarState—[out, retval] This parameter is a VARIANT structure that will contain information describing the user interface element's state.

19. IAccessible::get_accValue

HRESULT get_accValue(VARIANT varChild, BSTR* pszValue);

This function member retrieves the user interface element's Value property. This function member returns S_OK if successful or an error code otherwise.

varChild—[in] This parameter is a VARIANT structure identifying the user interface element whose value will be retrieved.

pszValue—[out, retval] This parameter is an address of a variable that will contain a string containing the user interface element's current value.

20. IAccessible::put_accName

HRESULT put_accName(VARIANT varChild, BSTR szName);

This function member sets the Name property for the indicated user interface element, and this function member returns S_OK if successful or an error code otherwise.

varChild—[in] This parameter is a value identifying the user interface element whose name will be set.

SzName—[in] This parameter is a string that specifies the name to be associated with this item.

21. IAccessible::put_accValue

HRESULT put_accValue(VARIANT varChild, BSTR szValue);

This function member sets the value of the user interface element's Value property for the current item. This function member returns S_OK if successful or an error code otherwise.

varChild—[in] This parameter is a VARIANT structure identifying the user interface element whose state will be retrieved.

szValue—[in] This parameter is a string containing the value to assign to the user interface element.

Handling the WM_GetObject Message

Figure 7:
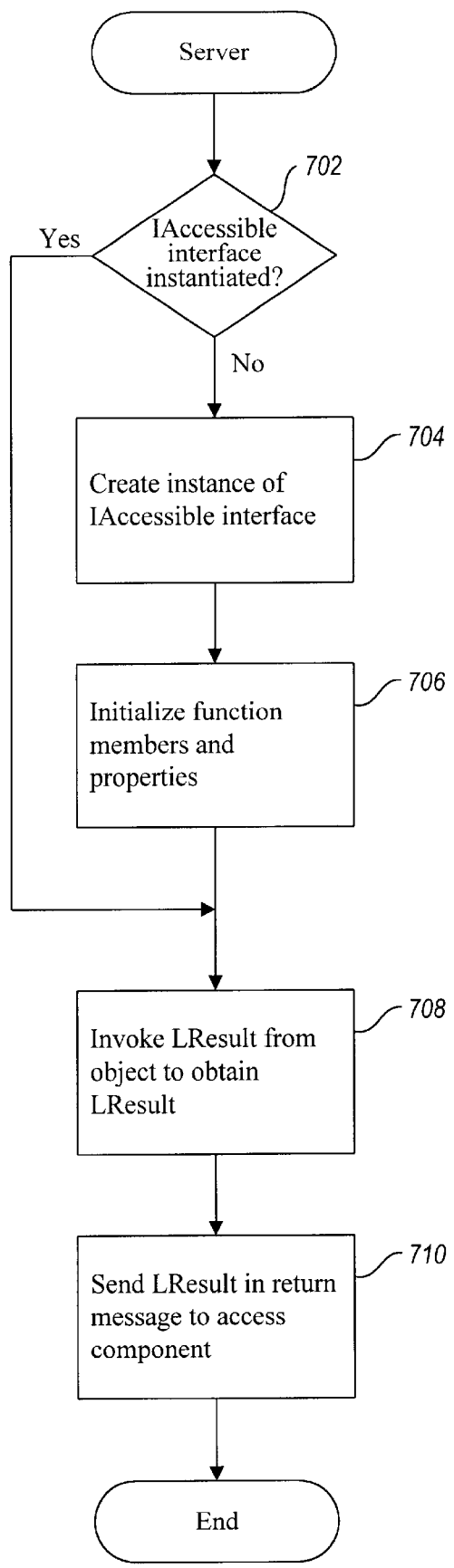
FIG. 7 depicts a flowchart of the steps performed by the server in response to receiving a WM_GetObject message.

In addition to exposing the IAccessible interface, to support the preferred architecture, the server must be able to handle a WM_GetObject message, which is received from the access component and which requests a reference to an IAccessible interface for a specified user interface element. The WM_GetObject message contains a number of parameters including a wParam parameter and an LParam parameter. The wParam parameter contains various flags ("dwFlags") that are used by the system and which are passed in as a parameter to the ObjectFromLResult function (described below). The LParam parameter contains an identifier of the specified user interface element. FIG. 7 depicts a flowchart of the steps performed by the server in response to receiving the WM_GetObject message. The first step performed by the server is to determine whether the user interface element has an instantiated IAccessible interface (step 702). Each user interface element of the server may not have an instantiated IAccessible interface because, upon instantiation, a significant amount of memory is utilized. Instead of reserving this memory for the lifetime of the server, the server may instead opt to only instantiate the IAccessible interface when it is necessary: when a request is made to obtain a reference to the IAccessible interface for the user interface element. Such is the case when the server receives a WM_GetObject message requesting an IAccessible interface for a particular user interface element. By deferring instantiation of the IAccessible interface until requested, the associated overhead is not incurred for the lifetime of the server. Typically, when a user interface element does not have an IAccessible interface instantiated, it does not currently conform to the component object model and does not support any of the standard OLE interfaces.

If the user interface element does not have an instantiated IAccessible interface, the server invokes the well-known OleInitialize function to indicate that a new object is being created and then instantiates the IAccessible interface for the user interface element (step 704). The server has a class definition defining the IAccessible interface, which inherits both the class definition for the IDispatch interface and the class definition for the IUnknown interface, and in this step, the server invokes the well-known "new" operator of the C++ programming language to create an instance of the IAccessible interface. After creating an instance of the IAccessible interface, the server initializes the function members and properties on the interface (step 706). For example, the property "value" is updated to reflect the current value of the user interface element. After initializing the function members and properties, or if the user interface element has already been instantiated, the server invokes the LResultFromObject function, provided by the access component, to obtain an LResult (step 708). An "LResult" is an identifier, described in greater detail below, maintained by the access component that is associated with the interface. When invoking the LResultFromObject function, an identifier of the IAccessible interface is passed to the access component as well as a reference to the user interface element's IUnknown interface. The server then sends the LResult in a return message to the access component of the operating system (step 710).

Aspects of the Preferred Architecture Supported by the Access Component

The access component supports a number of aspects of the preferred architecture, which are described below.

The LResultFromObject Function

The LResultFromObject function receives an identifier of an interface and returns an LResult. The LResultFromObject function is defined below.

LRESULT LresultFromObject(REFIID riid, WPARAM wParam, LPUNKNOWN punk);

This function receives a pointer to an IUnknown interface for a user interface element and generates a handle for the pointer, known as an LRESULT value. This function returns a positive number if successful or an error code otherwise.

riid—This parameter is a reference identifier of the interface that will be provided to the client. For example, the riid parameter may identify the IAccessible object interface.

wparam—This parameter is a value as provided in the wParam parameter received with the associated WM_GetObject message.

punk—This parameter is an address of the IUnknown interface for the user interface element whose reference is being generated.

Figure 8:
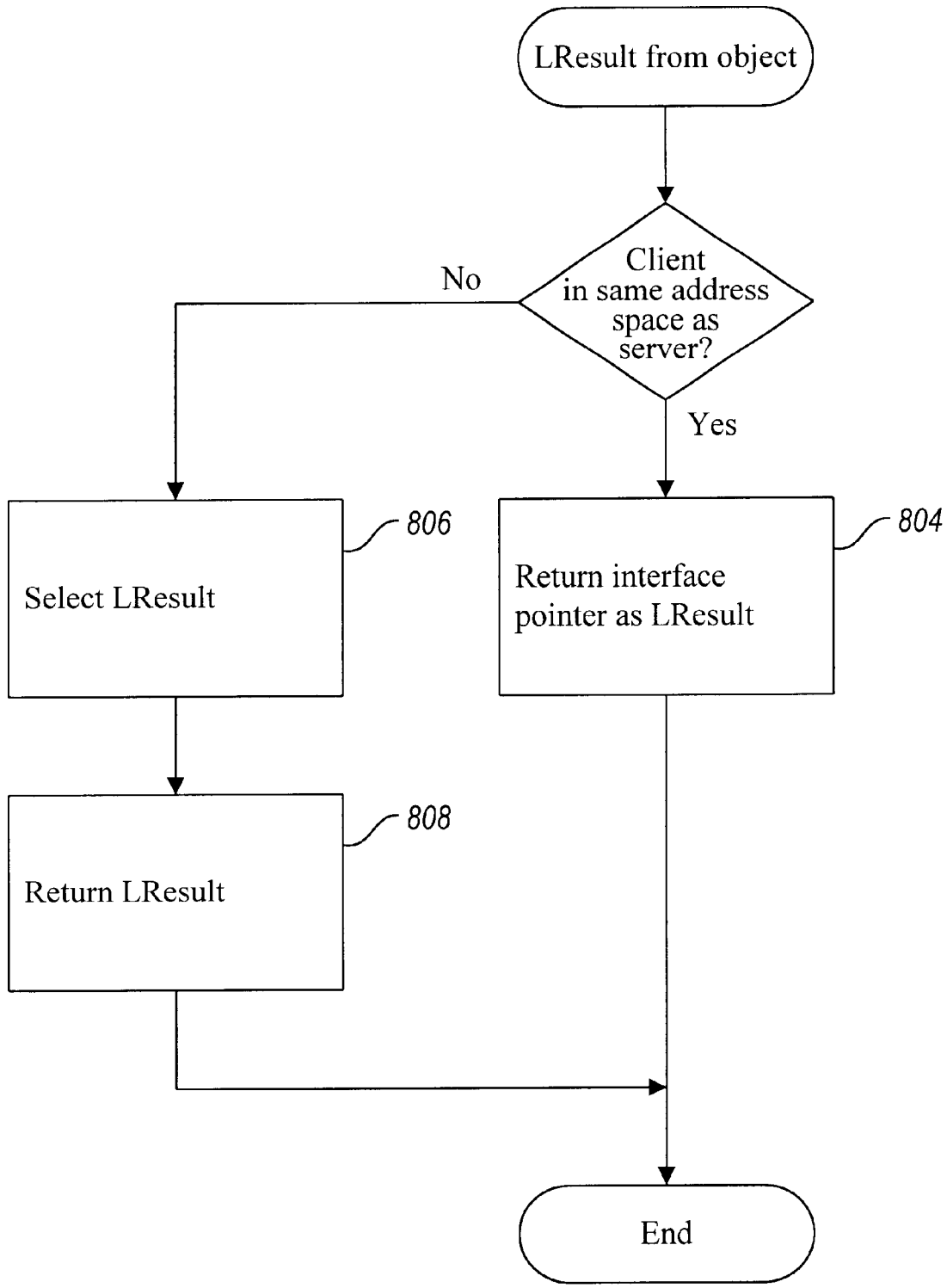
FIG. 8 depicts a flowchart of the steps performed by the LResultFromObject function.

FIG. 8 depicts a flowchart of the steps performed by the LResultFromObject function. The LResultFromObject function first determines if the client is in the same address space as the server (step 802). In this step, the access component queries the operating system for the process ids of both the client and the server and then determines if the process ids are equivalent. If the client is in the same address space as the server, the LResultFromObject function returns a reference to the IAccessible interface of the specified user interface element as the LResult (step 804). Since the client is in the same address space as the server, the interface does not need to be transferred across process boundaries, and thus, the pointer to the IAccessible interface is a valid address that the client can use. The reference to the IAccessible interface is obtained by invoking the QueryInterface function member of the IUnknown interface. However, if the client is not in the same address space as the server, the LResultFromObject function generates an LResult, because a pointer to the IAccessible interface will have to be transferred across process boundaries (step 806). The LResult is generated by retrieving the reference to the IAccessible interface using the IUnknown's QueryInterface function member and then by storing this reference into global memory. The address of where the reference is stored in global memory is the LResult. The LResultFromObject function then returns the LResult to the caller (step 808).

The ObjectFromLResult Function

The ObjectFromLResult function receives an LResult and returns an interface pointer. The access component maintains internally a mapping between all LResults and interface pointers to which the LResults refer. The ObjectFromLResult function is defined below.

STDAPI ObjectFromLresult(LRESULT IResult, REFIID riid, WPARAM wParam, void** ppvObject);

lResult—This parameter is a 32-bit value returned by a previous successful call to the LresultFromObject function.

riid—This parameter is a reference identifier of the interface to be retrieved. For example, an identifier of the IAccessible interface.

wParam—This parameter is additional information as provided in the associated wParam parameter of the WM_GetObject message.

ppvObject—This parameter contains the location, in screen coordinates, of the interface pointer to return. This parameter returns an interface pointer to an object given a 32-bit LRESULT value returned by a previous call to LresultFromObject on the same computer.

Figure 9:
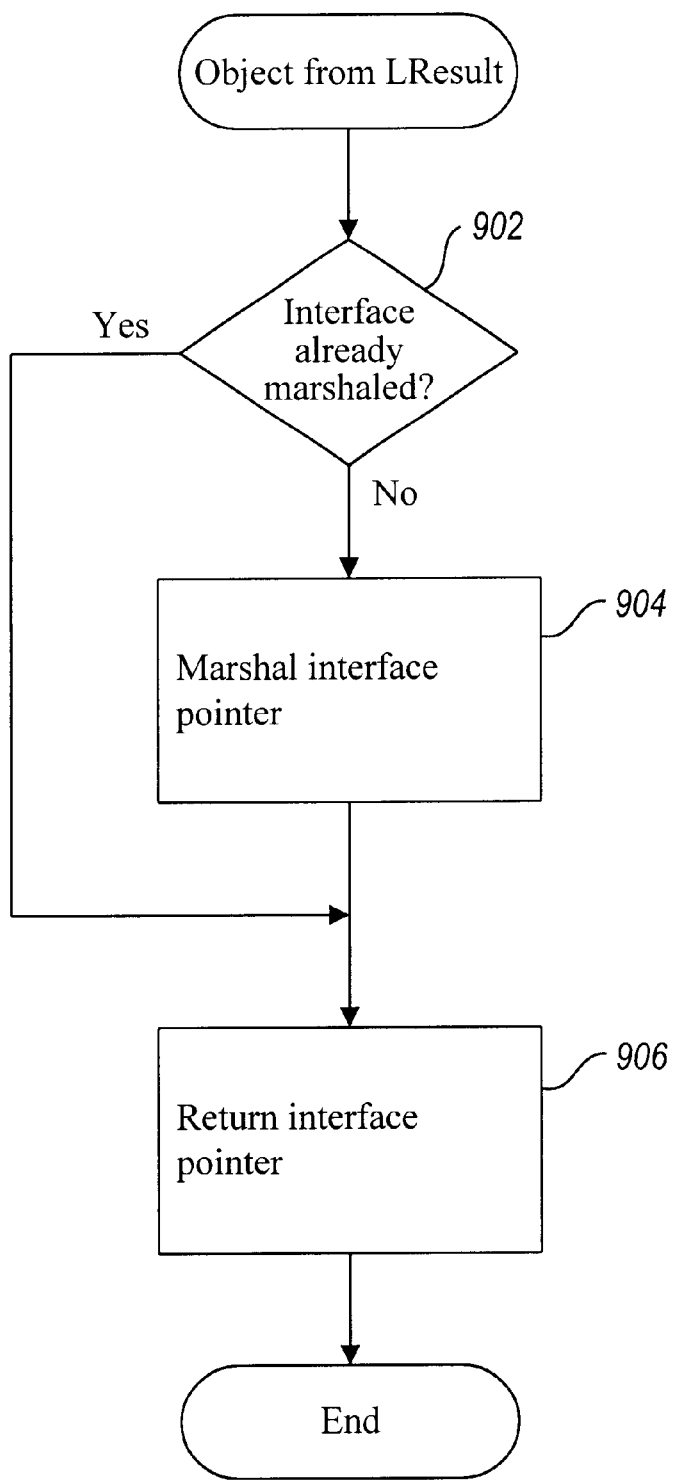
FIG. 9 depicts a flowchart of the steps performed by the ObjectFromLResult function.

FIG. 9 depicts a flowchart of the steps performed by the ObjectFromLResult function. The ObjectFromLResult function first determines if the interface pointer has already been marshaled across process boundaries (step 902). The process of providing interface access across process boundaries is known as "marshaling." The ObjectFromLResult function maintains an internal indication of all interfaces marshaled, and in this step, it determines if the interface has already been marshaled to the client. If the interface has not been marshaled, the ObjectFromLResult function marshals the interface pointer to the client (step 904). In this step, the ObjectFromLResult function establishes a channel through which the client may remotely access the function members on the IAccessible interface. This process is described in greater detail in U.S. Pat. No. 5,511,197, entitled "A Method and System for Network Marshaling of Interface Pointers for Remote Procedure Calls," issued Apr. 23, 1996, which is hereby incorporated by reference. After marshaling the interface pointer or if such a pointer has already been marshaled, the interface pointer is returned to the caller (step 906).

The SetWinEventHook Function

Figure 10:
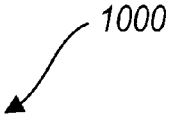
FIG. 10 depicts an event table utilized by an access component of the operating system.

The SetWinEventHook function receives from a client an indication of a range of events in which the client is interested in being notified as well as a reference to an EventHandler. An "EventHandler" is code which is invoked by the access component upon generation of the indicated event. Upon invocation, as shown in FIG. 10, the SetWinEventHook function stores in an event table 1000 an indication of the events and pointers to the registered event handlers. The SetWinEventHook function is defined below.

HWINEVENTHOOK WINAPI SetWinEventHook (UINT eventMin, UINT eventMax, HMODULE hmodWinEventProc, WINEVENTPROC lpfnWinEventProc, DWORD idprocess, DWORD idThread, UINT dwflags);

This function returns a value that identifies whether the event registration is successful.

lpfnWinEventProc—This parameter is an address of the event handler function.

idProcess—This parameter is an ID of the server to be monitored, or zero for all servers.

idThread—This parameter is an ID of the thread with which the callback function will be associated. If this parameter is zero, the event handler is associated with all existing threads.

eventMin—This parameter is an identifier describing the lowest event value in the range.

eventMax—This parameter is an identifier describing the highest event value in the range.

hmodWinEventProc—This parameter is a handle to the library containing the event handler.

dwflags—This parameter is flag values specifying one or more receiving options, such as whether the event handler should be invoked immediately upon generation of the event or whether the events should be queued before invoking the event handler.

Following is a list of some of the events generated by servers in the preferred architecture.

| Event | Description |
| --- | --- |
| EVENT_SYSTEM_SOUND | The system generates this event when a system sound (e.g., for menus) is played. The system will generate this event even if no sound is audible (for example, lack of a sound file to play, no sound card, etc.). |
| EVENT_SYSTEM_ALERT | An alert was generated. Message boxes generate this event when they are displayed. |
| EVENT_SYSTEM_FOREGROUND | The foreground window (the window appearing closest to the user) is changing. |
| EVENT_SYSTEM_MENUPOPUPSTART | A pop-up menu is being displayed. |
| EVENT_SYSTEM_MENUPOPUPEND | A pop-up menu is being removed. |
| EVENT_SYSTEM_CAPTURESTART | A window received mouse capture such that the mouse cursor is traversing over the window. |
| EVENT_SYSTEM_CAPTUREEND | A window lost mouse capture. |
| EVENT_SYSTEM_DRAGDROPSTART | An application program is about to enter drag-and-drop mode where a drag-and-drop operation is performed. |
| EVENT_SYSTEM_DRAGDROPEND | An application program is about to exit drag-and-drop mode where a drag-and-drop operation is performed. |
| EVENT_SYSTEM_DIALOGSTART | A dialog box was displayed. |
| EVENT_SYSTEM_DIALOGEND | A dialog box was removed. |
| EVENT_SYSTEM_SCROLLINGSTART | A scroll bar is being manipulated. |
| EVENT_SYSTEM_SCROLLINGEND | A scroll bar is no longer being manipulated. |
| EVENT_SYSTEM_SWITCHSTART | The user pressed ALT + TAB to move to another program running in the computer. |
| EVENT_SYSTEM_SWITCHEND | The user released ALT + TAB. |
| EVENT_SYSTEM_MINIMIZESTART | A window is about to be minimized or maximized. |
| EVENT_SYSTEM_MINIMIZEEND | A window was minimized or maximized. |
| EVENT_OBJECT_CREATE | Indicates that a window was created. In the case of windows only, both the parent and the child send this event. The child window sends the event when created, and the parent sends it after creation is complete. |
| EVENT_OBJECT_DESTROY | Indicates that a window was destroyed. In the case of window objects only, both the parent and the child send this event. The child window sends the event when it is destroyed, and the parent sends it after destruction is complete. |
| EVENT_OBJECT_SHOW | A user interface element is being displayed. |
| EVENT_OBJECT_HIDE | A user interface element is being hidden. |
| EVENT_OBJECT_REORDER | A user interface element's children are changing their z-order placements. The "z-order" refers to the depthwise appearance of the windows on the video display. |
| EVENT_OBJECT_FOCUS | A user interface element is receiving keyboard focus. |
| EVENT_OBJECT_SELECTION | A user interface element selection change occurred. |
| EVENT_OBJECT_SELECTIONADD | A user interface element was added to the selection. |
| EVENT_OBJECT_SELECTIONREMOVE | A user interface element. was removed from the selection. |
| EVENT_OBJECT_STATECHANGE | A user interface element's state changed. For example, a state change can occur when a button |

| Event | Description |
|---|---|
| | has been pressed or released, or when a button is being enabled or disabled. |
| EVENT_OBJECT_LOCATIONCHANGE | A user interface element is changing its location, shape, or size. |
| EVENT_OBJECT_NAMECHANGE | A user interface element's Name property changed. |
| EVENT_OBJECT_DESCRIPTIONCHANGE | A user interface element's Description property changed. |
| EVENT_OBJECT_VALUECHANGE | A user interface element's Value property changed. |
| EVENT_OBJECT_PARENTCHANGE | A user interface element has a new parent object. |
| EVENT_OBJECT_HELPCHANGE | A user interface element's Help property changed. |
| EVENT_OBJECT_DEFACTIONCHANGE | A user interface element's DefaultAction property changed. |
| EVENT_OBJECT_ACCELERATORCHANGE | A user interface element's KeyboardShortcut property changed. |

The NotifyWinEvent Function

The NotifyWinEvent function is invoked by a server to notify the access component that a predefined event has occurred within the application. The NotifyWinEvent function is defined below.

void WINAPI NotifyWinEvent(DWORD event, HWND hwnd, LONG idObject, LONG idChild);

event—This parameter indicates the event that occurred.

hwnd—Each window in the system has a window handle which uniquely identifies that window. The hwnd parameter is the window handle for the window generating the event.

idObject—This parameter is a value identifying the user interface element that generated the event.

idChild—This parameter is a value identifying the child of the user interface element specified in idObject that is generating the event. This value is CHILDID_SELF if the user interface element itself is generating the event.

Figure 11:
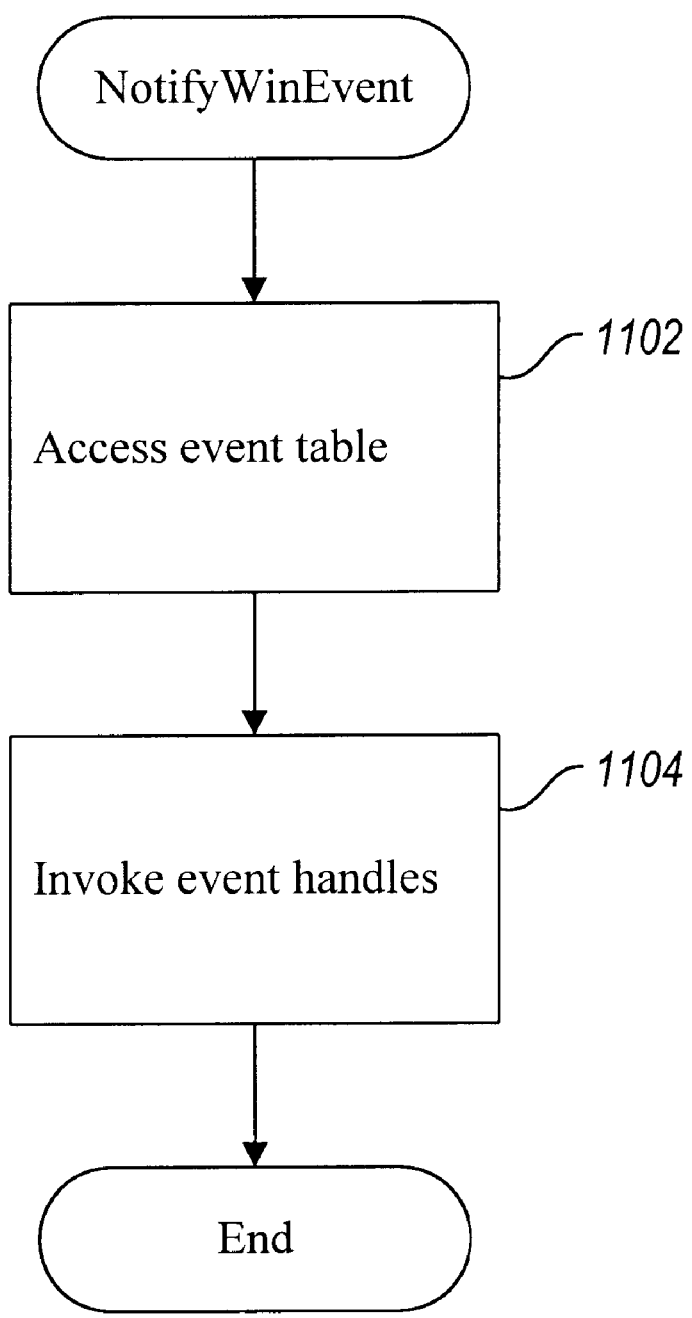
FIG. 11 depicts a flowchart of the steps performed by the NotifyWinEvent function provided by the access component of the operating system.

FIG. 11 depicts a flowchart of the steps performed by the NotifyWinEvent function. The NotifyWinEvent function first accesses the event table 1000 with the indication of the generated event to determine all of the event handlers stored for that event (step 1102). The function then invokes the appropriate event handlers (step 1104). The invocation of the event handlers notifies the clients that are registered of the occurrence of the event.

The AccessibleObjectFromPoint Function

The access component has three functions that are utilized by the client to obtain a reference to the IAccessible interface for a user interface element depending upon what information the client knows about the user interface element. For example, if the client knows the location of the user interface element on the display, the client can invoke the AccessibleObjectFromPoint function to obtain the interface pointer. If the client has received notification of an event, the client can obtain a pointer to the IAccessible interface by passing an identifier of the event into the AccessibleObjectFromEvent function. Likewise, if the client has a window handle, the client can invoke the AccessibleObjectFromWindow function to receive the IAccessible interface for the window. Each of these functions is described below.

The AccessibleObjectFromPoint function retrieves a reference to the IAccessible interface for a user interface element located at a specific point on the video display. The AccessibleObjectFromPoint function is defined below.

STDAPI AccessibleObjectFromPoint(POINT ptScreen, IAccessible** ppacc, VARIANT* pvarchild);

ptScreen—This parameter contains screen coordinates indicating the bounding rectangle of the user interface element.

ppacc—This parameter is an address of a variable that will contain the address of the user interface element's IAccessible interface.

pvarChild—This parameter is an address of a VARIANT structure containing the IAccessible interface of the user interface element or its parent. This function retrieves the lowest-level user interface element at a given point. If the user interface element at the point does not support IAccessible, then the function returns that user interface element's parent.

Figure 12:
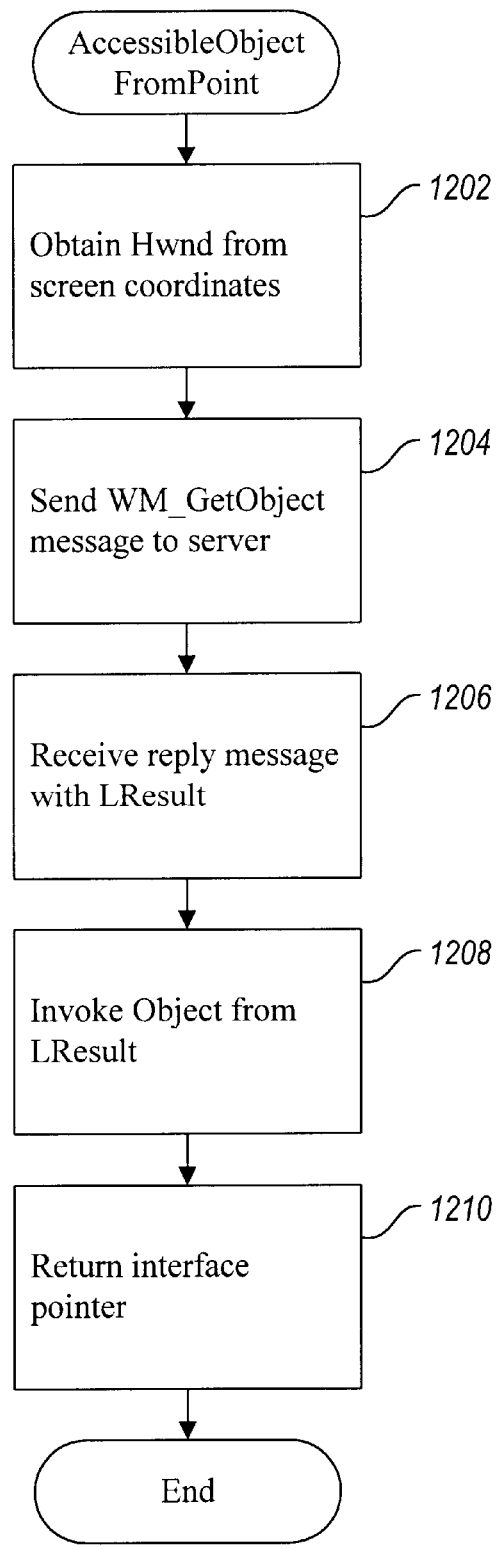
FIG. 12 depicts a flowchart of the steps performed by the AccessibleObjectFromPoint function provided by the access component of the operating system.

A flowchart of the steps performed by the AccessibleObjectFromPoint function is provided in FIG. 12. The AccessibleObjectFromPoint function receives he screen coordinates as a parameter and obtains the window handle for the window containing the user interface element (step 1202). In this step, the AccessibleObjectFromPoint function calls the well-known WindowFromPoint function of the operating system to return the window handle. The AccessibleObjectFromPoint function then sends the WM_GetObject message to the server to obtain a reference to the IAccessible interface (step 1204). The AccessibleObjectFromPoint function then receives a reply to the message from the server that contains an LResult (step 1206). The server obtained the LResult by invoking the LResultFromObject function. After receiving the LResult, the AccessibleObjectFromPoint function then invokes the ObjectFromLResult function (step 1208). The ObjectFromLResult function receives an LResult as input and returns a pointer to the IAccessible interface for the user interface element. After receiving the interface pointer, the AccessibleObjectFromPoint function returns the interface pointer to the caller (step 1210).

The AccessibleObjectFromEvent and AccessibleObjectFromWindow Functions

Both the AccessibleObjectFromEvent and the AccessibleObjectFromWindow functions perform similar processing to the AccessibleObjectFromPoint function. However, these functions receive a window handle as a parameter and thus can skip step 1202 and only have to perform steps 1204–1210 of FIG. 12. Both the AccessibleObjectFromEvent function and the AccessibleObjectFromWindow function are defined below.

STDAPI AccessibleObjectFromEvent(HWND hwnd, DWORD dwId, DWORD dwChildId, IAccessible** ppacc, VARIANT* pvarchild);

hwnd—This parameter is a handle to the window that generated the event.

dwId—This parameter is an identifier of the user interface element.

dwChildId—This parameter is an identifier of the user interface element r its child who generated the event.

ppacc—This parameter is an address of a variable that will contain the address of the child user interface element's IAccessible interface if the user interface element has one. If not, this parameter will contain the address of the IAccessible interface of the child's parent.

pvarChild—This parameter is an address of a VARIANT structure that will contain either the IAccessible interface pointer of the child user interface element or the IAccessible interface of the child's parent user interface element. This function retrieves the lowest-level user interface element that is associated with an event. If the child that generated the event does not support the IAccessible interface, then the function returns that child's parent.

STDAPI AccessibleObjectFromWindow(HWND hwnd, DWORD dwId, REFIID riid, void **ppvObject);

hwnd —This parameter is a handle to the window whose IAccessible interface pointer will be retrieved.

dwId—This parameter is an identifier of the user interface element.

riid—This parameter is a reference identifier of the interface being requested (e.g., the IAccessible interface).

ppvObject—This parameter is an address of a variable that will contain the address of the specified interface. Clients can call this function to retrieve addresses of a user interface element's IAccessible, IDispatch, IUnknown, or other supported interface. If the requested interface is not supported, the function returns an error code.

DETAILED EXAMPLE

Figure 13:
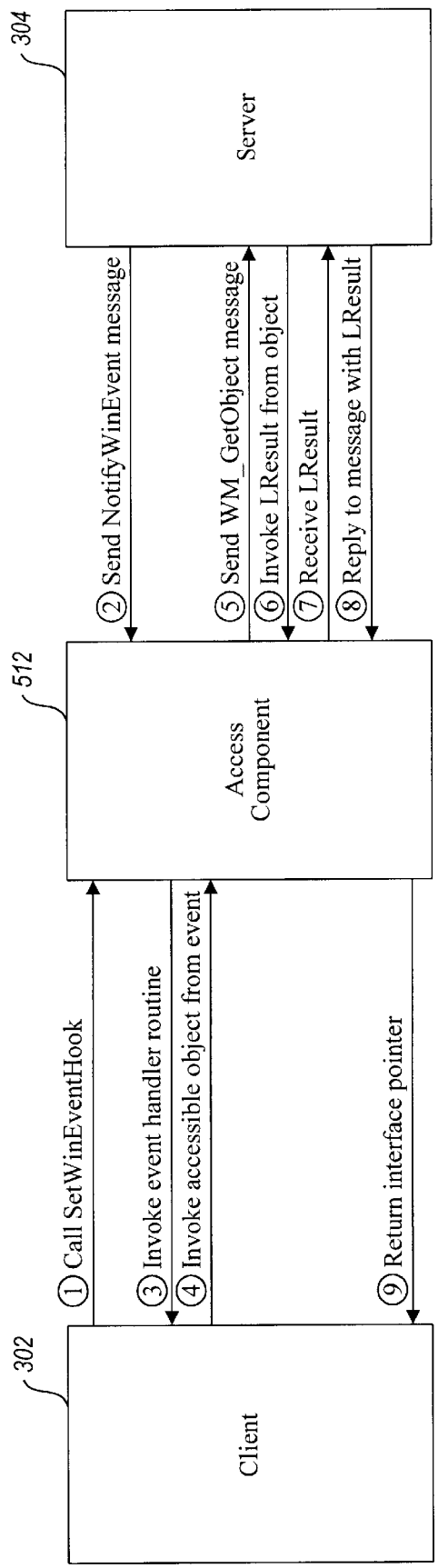
FIG. 13 depicts a more detailed diagram of the interactions between the client, the access component, and the server depicted in FIG. 3.

FIG. 13 depicts a more detailed diagram of the interactions between the client 302, the access component 412, and the server 304 that particularly indicates the functionality performed by each when performing the functionality described in FIG. 4. This detailed example more clearly illustrates the relationship between all of the aspects of the preferred architecture previously described. First, to be notified of the occurrence of an event, the client 302 invokes the SetWinEventHook function of the access component 412. Second, some time later, the server 304 generates an event for a user interface element for which the client is interested, and thus, the server invokes the NotifyWinEvent function of the access component 412. Third, the access component 412 performs a look-up into the event table to determine all event handlers registered for this event and invokes these event handlers, one of which belongs to the client. Fourth, the client's event handler invokes the AccessibleObjectFromEvent function of the access component 412.

Fifth, upon invocation, the AccessibleObjectFromEvent function of the access component sends a WM_GetObject message to the server 304. Sixth, in response to receiving this message, the server 304 instantiates an IAccessible interface for the user interface element if necessary and invokes the LResultFromObject function of the access component 412. Seventh, the LResultFromObject function of the access component 412 assigns an LResult to the user interface element's IAccessible interface and returns the LResult to the server 304. Eighth, after having received the LResult, the server 304 sends the LResult in a reply message to the access component 412, the reply message replying to the WM_GetObject message. Ninth, after receiving the LResult, the access component 412 invokes the ObjectFromLResult function to marshal the interface pointer across process boundaries to the client 302. After receiving the interface pointer, the client 302 can directly access and manipulate the user interface elements of the server 304 without having any knowledge of the functionality of the server or any a priori knowledge of the user interface elements of the server.

Traversing the Server's Menu Structure

Figure 14:
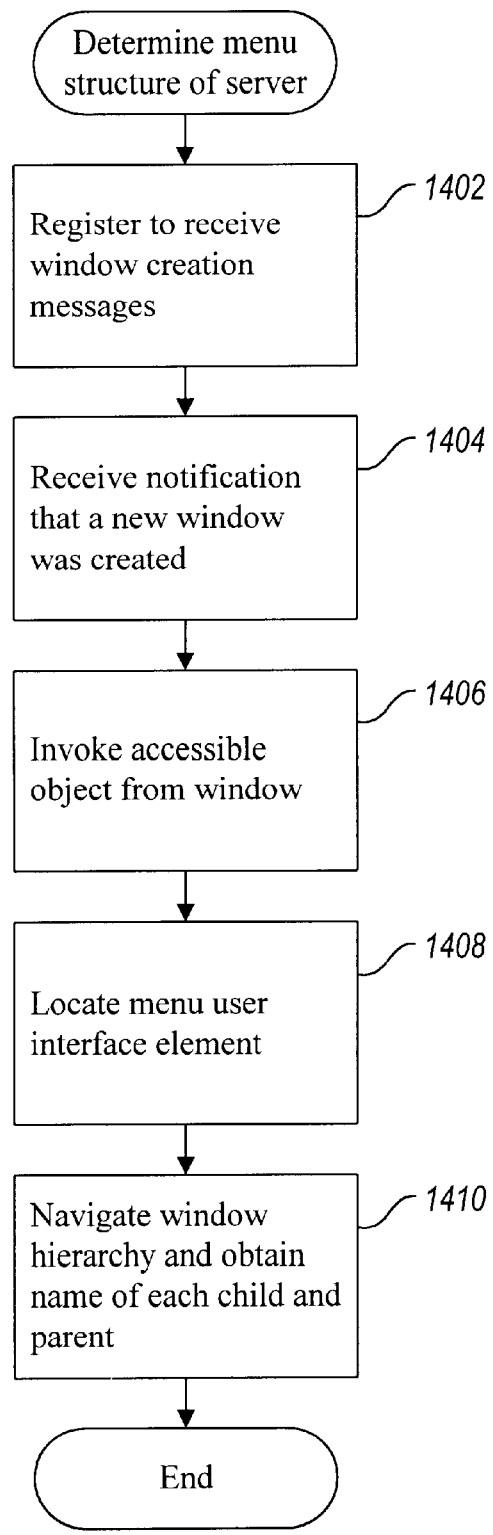
FIG. 14 depicts a flowchart of the steps performed by a client when determining the menu structure of the server.

As stated above, by using the preferred architecture, a client can traverse the server's menu structure without the server having to display its menu. This functionality is advantageous to a user who is unable to view the visual representation of the menu structure, but would nonetheless like to traverse the menus to determine the functionality and the commands performed by the server. FIG. 14 depicts a flowchart of the steps performed by a client to determine the menu structure of the server. To traverse the menus, the client first registers with the access component, using the WinSetEventHook function, to be notified when a window has been created (step 1402). In this step, the client registers an event handler with the access component and requests notification of all EVENT_OBJECT_CREATE events. The client then receives a notification that a new window has been created on the display, and the client's event handler is invoked (step 1404). The client's event handler invokes the AccessibleObjectFromWindow function of the access component to receive a pointer to the IAccessible interface of the window (step 1406). In the notification received in step 1404, the client receives the window handle of the window that was created, and this window handle is passed in as a parameter to the AccessibleObjectFromWindow function.

After receiving a pointer to the IAccessible interface, the client locates the menu user interface element (step 1408). The client locates the menu by navigating through all user interface elements and locating the user interface element where the form property of the user interface element indicates that it is a "menu." After locating the menu user interface element, the client navigates the window hierarchy and retrieves the name of each child and parent (step 1410). The menu of an application program typically forms a hierarchy with the user interface element representing the entire menu at the top of the hierarchy (i.e., the parent), the submenus (e.g, file, edit, and view) in the middle of the hierarchy (i.e., children of the parent), and the items on the submenus (e.g., cut, paste, and copy) at the bottom of the hierarchy (i.e., grandchildren to the parent). The menu user interface element identified in step 1408 is the parent of the menu hierarchy. From this parent, the submenu user interface elements are accessed by using the accNavigate and the get_accChild function members, and from the submenu user interface elements, the items (or commands) in each submenu are obtained by using the same function members. In this manner, the client can identify all commands supported by the server.

While the present invention has been described with reference to a preferred embodiment thereof, those skilled in the art will know of various changes in form and detail that may be made without departing from the spirit and scope of the claimed invention as defined in the appended claims.

What is claimed is:

1. A method performed by an application program in a computer system for providing direct access to user interface elements of an application program, comprising the steps of:

selecting, by a client application, a programmatic access component for use by the client application;

receiving, from the client application, a programmatic request identifying a user interface element to access via the programmatic access component;

accessing the identified user interface element on behalf of the client application responsive to the received programmatic request;

attaching a description to the identified user interface element;

requesting the description by the programmatic request; and returning the description to the client application by the step of directly accessing the identified user interface element; and conveying said description of said user interface element to a user.

2. The method of claim 1, wherein the step of selecting a programmatic access component includes selecting an interface containing at least one function member that is utilized by the client application to directly access at least one of the user interface elements of the application program.

3. The method of claim 1, further comprising the steps of:

including a default action in the identified user interface element;

requesting by the programmatic request that the application program perform the default action on the identified user interface element; and performing the default action on the identified user interface element by the step of directly accessing the identified user interface element.

4. The method of claim 1, further comprising the steps of:

connecting the user interface element to a plurality of relations;

requesting one of the plurality of relations by the programmatic request;

accessing a related user interface element that is related to the identified user interface element via the requested relation; and returning a reference to the related identified user interface element to the client application.

5. The method of claim 1, wherein the programmatic request selects the identified user interface element.

6. The method of claim 1, further comprising the steps of:

attaching a help string to the identified user interface element that provides useful information to the user;

requesting the help string of the identified user interface element by the programmatic request; and returning the help string to the client in the step of directly accessing.

7. The method of claim 1, further comprising the steps of:

attaching an associated help topic to the identified user interface element that provides useful information to the user;

requesting an identifier of the associated help topic of the identified user interface element by the programmatic request; and returning the identifier of the associated help topic to the client in the step of directly accessing.

8. The method of claim 1, further comprising the steps of:

attaching an invocable response to a user depression of a key on a keyboard input device;

requesting an indication of the key by the programmatic request; and returning the indication of the key to the client application in the step of directly accessing.

9. The method of claim 1, further comprising the steps of:

associating a name to the identified user interface element;

requesting the name associated to the identified user interface element by the programmatic request; and returning the name to the client application in the step of directly accessing.

10. The method of claim 1, further comprising the steps of:

associating one of the user interface elements with a parent user interface element having a parent/child relationship with a child user interface element;

supporting the parent user interface element with an IDispatch interface;

associating the identified user interface element as the child user interface element;

requesting a reference to the IDispatch interface of the parent by the programmatic request;

accessing the reference to the IDispatch interface of the parent user interface element by the step of directly accessing; and returning the reference to the IDispatch interface to the client in the step of directly accessing.

11. The method of claim 1, further comprising the steps of:

linking a value to the identified user interface element;

providing a new value for the user interface element by the programmatic request; and setting the value of the user interface element to the new value by the directly accessing step.

12. The method of claim 1, further comprising receiving, by the client application, a notification when the user interface element changes status.

13. A method for accessing user interface elements of a first application program performed by a client application using a computer system, comprising the steps of:

requesting, by the client application, a first programmatic access component from the first application program;

receiving the first programmatic access component;

utilizing the first programmatic access component to directly and programmatically access at least one of the user interface elements on behalf of the client application;

conveying a description of said at least one of the user interface elements to a user.

14. The method of claim 13, wherein the first programmatic access component is an interface containing at least one function member that provides access to the identified user interface element.

15. The method of claim 13, further comprising the steps of:

requesting a second application program having a second programmatic access component, where the second application program is substantially different than the first application program and the second programmatic access component has a definition for utilization that is equivalent to the definition of the first programmatic access component;

receiving the second programmatic access component from the second application program; and utilizing the second programmatic access component in a substantially same manner as the first programmatic access component to directly and programmatically access at least one of the user interface elements of the second application program.

16. The method of claim 15, further comprising the step of:

requesting that the second application program perform a default action on the identified user interface element.

17. The method of claim 13, further comprising the step of:

referencing the identified user interface element that supports an IDispatch interface.

18. The method of claim 13, further comprising the steps of:

connecting the user interface elements to a plurality of relations;

requesting one of the relations by the first programmatic access component;

accessing a related user interface element that is related to the at least one user interface elements via the indicated relation; and receiving a reference to the related user interface element.

19. The method of claim 13, further comprising the step of:

selecting the at least one user interface elements by utilizing the first programmatic access component.

20. The method of claim 13, further comprising the steps of:

attaching a help string to the at least one user interface elements that provides useful information to the user;

requesting the help string of the at least one user interface elements by the first programmatic access component; and receiving the help string of the identified user interface element from the first application program.

21. The method of claim 13, further comprising the steps of:

attaching a help topic to the at least one user interface elements;

requesting the help topic of the at least one user interface element by the first programmatic access component; and receiving the identifier of the help topic from the first application program.

22. The method of claim 13, further comprising the steps of:

associating a name to the at least one user interface elements;

requesting the name associated to the at least one user interface elements by the first programmatic access component; and receiving the name from the first application program.

23. The method of claim 13, further comprising the steps of:

associating one of the user interface elements with a parent user interface element having a parent/child relationship with a child user interface element;

supporting the parent user interface element with an IDispatch interface;

associating the child user interface element with the parent user interface elements;

requesting a reference to the IDispatch interface of the parent user interface element by the first programmatic access component;

accessing the reference to the IDispatch interface of the parent user interface element by the step of directly accessing; and receiving the reference to the IDispatch interface of the parent user interface element from the first application program.

24. The method of claim 13, further comprising the steps of:

linking a value to the at least one user interface elements;

providing a new value for the at least one user interface element by the first programmatic access component; and setting the value of the at least one user interface element to the new value.

25. The method of claim 13, further comprising receiving, by the client application, a notification when the user interface element changes status.

26. A method for accessing user interface elements of a first application program by a client application using a computer system, comprising the steps of:

requesting, by the client application, a reference to an interface supported by the first application program, the interface comprising at least one function member that provides access to at least one of the user interface elements;

receiving the reference to the interface;

invoking the function member to directly access and manipulate the user interface element in a second application independently such that access and manipulation of the second application user interface elements support the interface in a same manner; and receiving, by the client application, a notification when one of the user interface elements changes status.

27. A computer system comprising:

a video display displaying user interface elements;

a memory, further comprising:

an application program for displaying the user interface elements on the video display, and for providing direct access to an implementation of the user interface elements by selecting an interface containing function members that each access the implementation of the user interface elements;

an accessibility aid for invoking the function members on the interface to provide a user with access to the implementation of the user interface elements; and an operating system for providing the accessibility aid with access to the interface of the application program and for conveying a description of said user interface element to the user; and a processor for running the application program, the operating system, and the accessibility aid.

28. A computer-readable medium containing instructions for controlling a computer system to perform a method for accessing a user interface element of a computer program, the user interface element having a class definition that is able to be instantiated into an object, the method comprising the steps of:

requesting, by a client application, a reference to an interface supported by the first application program, the interface comprising at least one function member that provides access to at least one of the user interface elements;

receiving the reference to the interface;

invoking the function member to directly access and manipulate the user interface element in a second application independently such that access and manipulation of the second application user interface elements support the interface in a same manner; and receiving, by the client application, a notification when one of the user interface elements changes status.

* * * * *

UNITED STATES PATENT AND TRADEMARK OFFICE
CERTIFICATE OF CORRECTION

PATENT NO. : 6,334,157 B1
DATED : December 25, 2001
INVENTOR(S) : Charles Oppermann et al.

It is certified that error appears in the above-identified patent and that said Letters Patent is hereby corrected as shown below:

Column 10,
Line 25, "referred" has been replaced with -- preferred --;

Column 13,
Line 40, "comer" has been replaced with -- corner --;

Column 28,
Line 51, "(e.g, file" has been replaced with -- (e.g., file --.

Signed and Sealed this

Eleventh Day of February, 2003

JAMES E. ROGAN
*Director of the United States Patent and Trademark Office*